(12) United States Patent  
Awazu

(10) Patent No.: US 10,771,702 B2  
(45) Date of Patent: Sep. 8, 2020

(54) MOVABLE SUPPORT DEVICE, IMAGE SHAKE CORRECTION DEVICE, AND IMAGING DEVICE

(71) Applicant: FUJIFILM Corporation, Tokyo (JP)

(72) Inventor: Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/831,703

(22) Filed: Mar. 26, 2020

(65) Prior Publication Data

US 2020/0228712 A1 Jul. 16, 2020

Related U.S. Application Data

(63) Continuation of application No. PCT/JP2018/035904, filed on Sep. 27, 2018.

(30) Foreign Application Priority Data

Sep. 27, 2017 (JP) ................................ 2017-186877

(51) Int. Cl.
  *H04N 5/232* (2006.01)
  *H04N 5/225* (2006.01)
(52) U.S. Cl.
  CPC ..... *H04N 5/23287* (2013.01); *H04N 5/23258* (2013.01); *H04N 5/2253* (2013.01)
(58) Field of Classification Search
  CPC .................... H04N 5/23287; H04N 5/23258
  See application file for complete search history.

(56) References Cited

U.S. PATENT DOCUMENTS

2009/0027506 A1 1/2009 Kobayashi et al.
2011/0205378 A1* 8/2011 Kobayashi ............. G03B 17/02
  348/208.11

(Continued)

FOREIGN PATENT DOCUMENTS

JP  2000-330155 A  11/2000
JP  2007-135198 A  5/2007

(Continued)

OTHER PUBLICATIONS

International Search Report issued in PCT/JP2018/035904; dated Dec. 25, 2018.

(Continued)

*Primary Examiner* — Nicholas G Giles
(74) *Attorney, Agent, or Firm* — Studebaker & Brackett PC

(57) ABSTRACT

A movable support device includes: a movable unit that includes an imager, a first flexible substrate including wirings connected to terminals other than a power supply terminal and a ground terminal among terminals of the imager, and a second flexible substrate including wirings connected to the power supply terminal and the ground terminal; and a support member that supports the movable unit to be movable in a longitudinal direction of a light receiving surface of the imager and a short direction of the light receiving surface, the first flexible substrate includes a first portion extending in one direction of the short direction and a folded portion folded at an end portion of the first portion in other direction of the short direction, and the second flexible substrate includes a second portion and a folded portion as defined herein.

6 Claims, 23 Drawing Sheets

(56) References Cited

U.S. PATENT DOCUMENTS

| | | | |
|---|---|---|---|
| 2013/0100304 A1* | 4/2013 | Wade | H04N 5/23287 348/208.4 |
| 2016/0170227 A1* | 6/2016 | Minamisawa | G02B 27/646 359/557 |
| 2018/0171991 A1* | 6/2018 | Miller | G02B 7/09 |

FOREIGN PATENT DOCUMENTS

| | | |
|---|---|---|
| JP | 2009-053671 A | 3/2009 |
| JP | 2014-149550 A | 8/2014 |
| JP | 2015-075658 A | 4/2015 |
| JP | 2015-210316 A | 11/2015 |

OTHER PUBLICATIONS

Written Opinion issued in PCT/JP2018/035904; dated Dec. 25, 2018.

* cited by examiner

MOVABLE SUPPORT DEVICE, IMAGE SHAKE CORRECTION DEVICE, AND IMAGING DEVICE

CROSS REFERENCE TO RELATED APPLICATION

This is a continuation of International Application No. PCT/JP2018/035904 filed on Sep. 27, 2018, and claims priority from Japanese Patent Application No. 2017-186877 filed on Sep. 27, 2017, the entire disclosures of which are incorporated herein by reference.

BACKGROUND OF THE INVENTION

1. Field of the Invention

The present invention relates to a movable support device, an image shake correction device, and an imaging device.

2. Description of the Related Art

An imaging device comprising an imager that images a subject through an imaging optical system or a lens device used by being attached to the imaging device has an image shake correction function of correcting shake (hereinafter, referred to as image shake) of a captured image caused by vibration of the apparatus.

For example, in the lens device, image shake correction is performed by moving a correction lens included in an imaging optical system in a surface perpendicular to an optical axis such that the vibration of the apparatus is detected based on information from a motion detection sensor such as an acceleration sensor or angular velocity sensor mounted on the lens device and the detected vibration is canceled.

In the imaging device, the image shake correction is performed by moving one or both of the correction lens included in the imaging optical system and the imager on a surface perpendicular to an optical axis such that the vibration of the apparatus is detected based on information from a motion detection sensor such as an acceleration sensor or an angular velocity sensor mounted on the imaging device and the detected vibration is canceled.

JP2009-053671A, JP2000-330155A, and JP2015-075658A describe an image shake correction device that performs image shake correction by moving a correction lens.

JP2014-149550A describes an image shake correction device that performs image shake correction by moving a camera module including an imager and a lens in a surface perpendicular to an optical axis.

SUMMARY OF THE INVENTION

In these image shake correction devices, since the movable member is influenced by gravity, it is necessary to drive the movable member in a direction opposite to a gravity direction so as to cancel a movement amount of the movable member due to the gravity.

In order to reduce a power required in such driving, in JP2014-149550A, a flexible print substrate is drawn in up, down, left, and right directions of the camera module, and the camera module is held at a neutral position due to an elastic force of the flexible print substrate.

The elastic force of the flexible print substrate also acts in a direction in which the driving is hindered in a case where the movable member is driven. Thus, it is important to reduce the elastic force as small as possible in order to improve drive response characteristics of the movable member. JP2014-149550A does not recognize such problems.

JP2009-053671A, JP2000-330155A, and JP2015-075658A describe that the flexible print substrate is drawn from the movable member in two directions perpendicular to each other, and do not consider the influence of the gravity on the movable member.

Here, the problems of the image shake correction device are illustrated, but the same problems occur in any device that has a movable member supported to be movable in a direction along a flat surface parallel to the gravity direction and needs to drive the movable member.

The present invention has been made in view of such circumstances, and an object of the present invention is to provide a movable support device capable of improving drive response characteristics of a movable member while reducing a power required for driving the movable member, an image shake correction device including the movable support device, and an imaging device including the movable support device.

A movable support device of the present invention comprises a movable unit that includes an imager, a first flexible substrate including wirings connected to terminals other than a power supply terminal and a ground terminal among terminals of the imager, and a second flexible substrate including wirings connected to the power supply terminal and the ground terminal, and a support member that supports the movable unit to be movable in a longitudinal direction of a light receiving surface of the imager and a short direction of the light receiving surface. The first flexible substrate includes a first portion extending in one direction of the short direction and a folded portion folded at an end portion of the first portion in the other direction of the short direction, and the second flexible substrate includes a second portion extending in the other direction of the short direction and a folded portion folded at an end portion of the second portion in the one direction of the short direction.

An image shake correction device of the present invention comprises the movable support device.

The imaging device of the present invention includes the image shake correction device.

According to the present invention, it is possible to provide a movable support device capable of improving drive response characteristics of a movable member while reducing a power required for driving the movable member, an image shake correction device including the movable support device, and an imaging device including the movable support device.

DESCRIPTION OF THE PREFERRED EMBODIMENTS

Hereinafter, embodiments of the present invention will be described with reference to the drawings.

Figure 1:
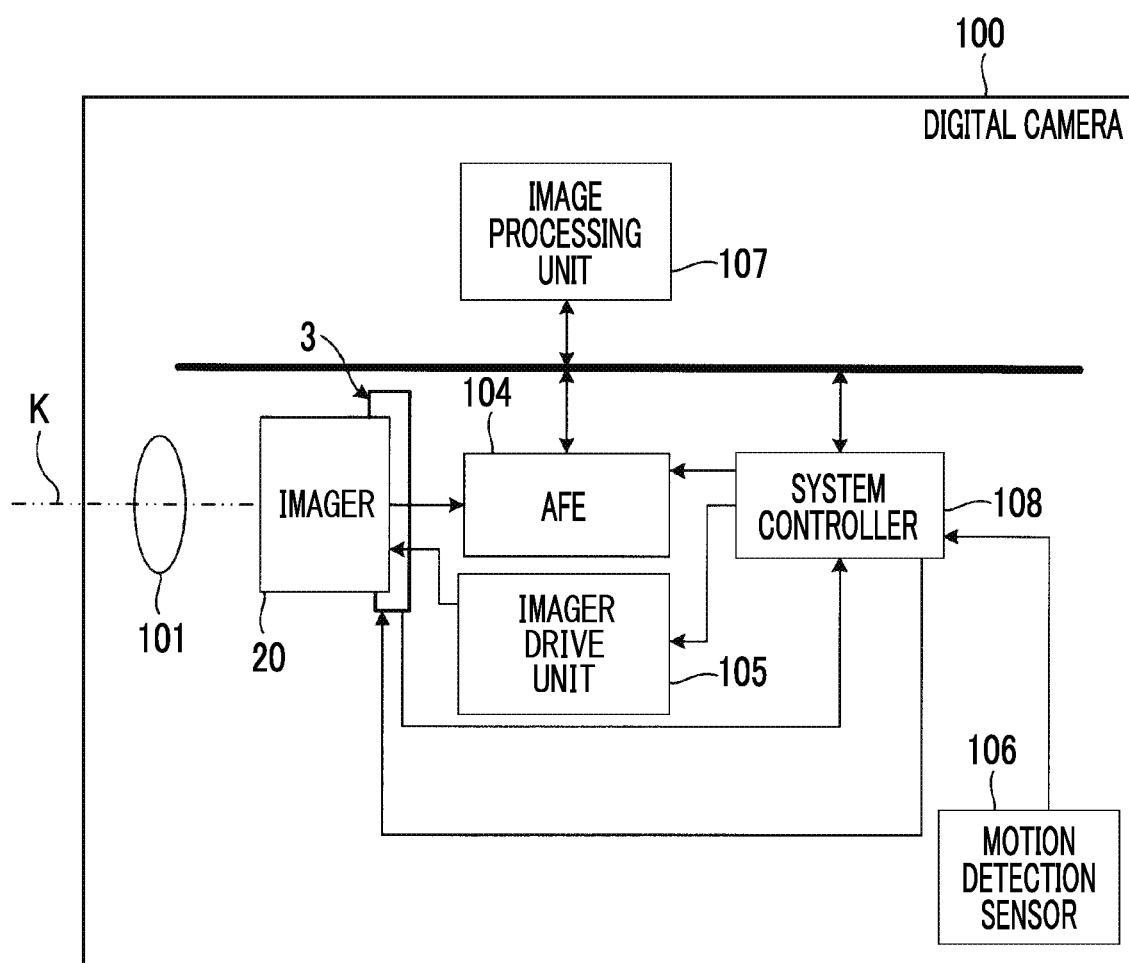
FIG. 1 is a diagram showing a schematic configuration of a digital camera 100 which is an embodiment of an imaging device of the present invention.

FIG. 1 is a diagram showing a schematic configuration of a digital camera 100 which is an embodiment of an imaging device of the present invention.

The digital camera 100 comprises an imaging optical system 101, an imager 20, an image shake correction device 3, an imager drive unit 105 that drives the imager 20, an analog front end (AFE) 104, an image processing unit 107, a motion detection sensor 106, and a system controller 108 that performs overall control of the entire digital camera 100.

The imaging optical system 101 includes a focus lens or a zoom lens, and a stop.

The imager 20 images a subject through the imaging optical system 101, and comprises a semiconductor chip on which on which a charge coupled device (CCD) image sensor or a complementary metal oxide semiconductor (CMOS) image sensor is formed and a package that accommodates the semiconductor chip.

Figure 3:
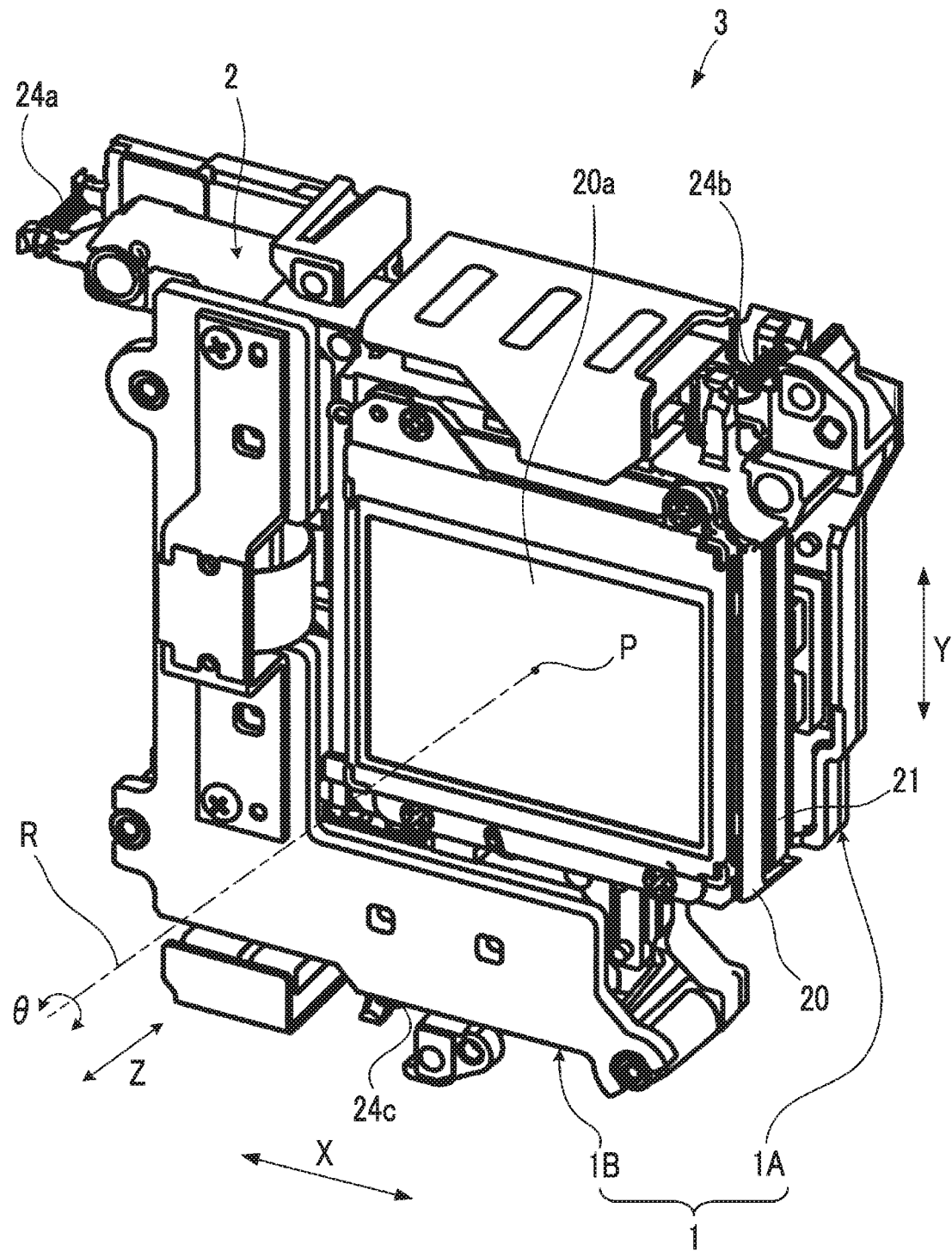
FIG. 3 is a perspective view showing an appearance configuration of the image shake correction device 3 shown in FIGS. 1 and 2.

As shown in FIG. 3 to be described below, a light receiving surface 20a of the imager 20 has a rectangular shape.

The image shake correction device 3 corrects image shake of a captured image captured by the imager 20 by moving the light receiving surface 20a of the imager 20 within a surface perpendicular to an optical axis K of the imaging optical system 101.

In the present specification, in the digital camera 100, the light receiving surface 20a of the imager 20 is perpendicular to a gravity direction (the optical axis K is parallel to the gravity direction), and a state in which the image shake correction device 3 is not energized is a reference state. In this reference state, a center P (see FIG. 3) of the light receiving surface 20a is located on the optical axis K.

Although the detailed configuration of the image shake correction device 3 will be described below, the image shake is corrected by moving the imager 20 in three directions of a first direction which is a longitudinal direction (direction X shown in FIG. 3) of the light receiving surface 20a of the imager 20 in the reference state, a second direction which is a short direction (direction Y shown in FIG. 3) of the light receiving surface 20a of the imager 20 in the reference state, and a third direction which is a direction (direction θ shown in FIG. 3) along a circumference of a circle using the center P of the light receiving surface 20a of the imager 20 in this reference state as a center.

The AFE 104 includes a signal processing circuit that performs correlative double sampling processing and digital conversion processing on imaging signals output from the imager 20.

The image processing unit 107 performs digital signal processing on the imaging signals processed by the AFE 104, and generates captured image data such as a Joint Photographic Experts Group (JPEG) format.

The motion detection sensor 106 is a sensor that detects the movement of the digital camera 100, and includes an acceleration sensor, an angular velocity sensor, or both thereof.

The system controller 108 controls the imager drive unit 105 and the AFE 104 such that the subject is captured by the imager 20 and the imaging signal corresponding to a subject image is output from the imager 20.

The system controller 108 controls the image shake correction device 3 based on movement information of the digital camera 100 detected by the motion detection sensor 106. The system controller 108 corrects the image shake of the captured image captured by the imager 20 by moving the light receiving surface 20a of the imager 20 in at least one of the direction X, the direction Y, and the direction θ.

In a state in which the image shake correction device 3 is energized, in a case where the movement of the digital camera 100 is not detected by the motion detection sensor 106, the system controller 108 controls the image shake correction device 3 such that a position of the light receiving surface 20a of the imager 20 is a position in the reference state.

Figure 2:
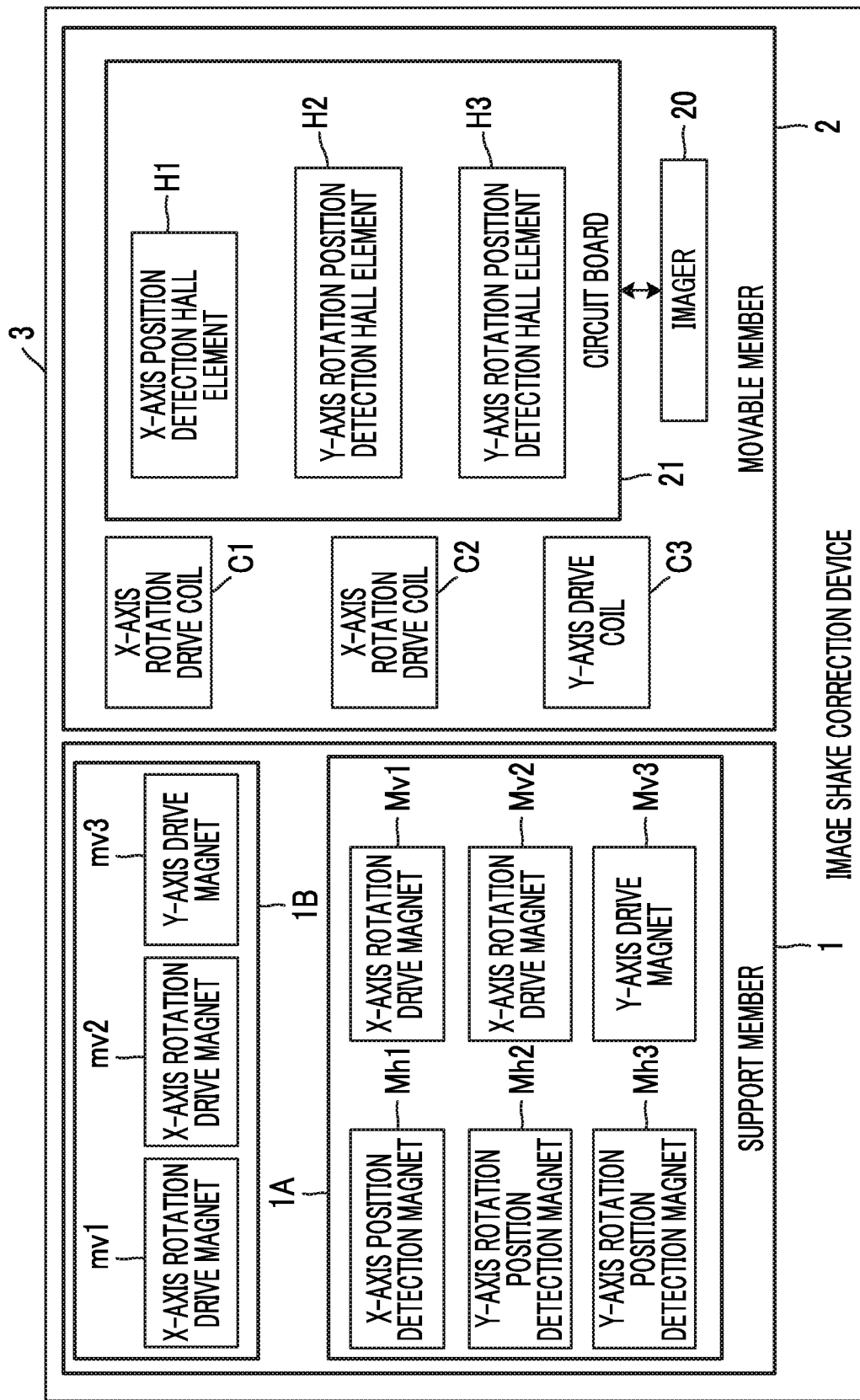
FIG. 2 is a diagram showing a schematic configuration of an image shake correction device 3 in the digital camera 100 shown in FIG. 1.

FIG. 2 is a diagram showing a schematic configuration of the image shake correction device 3 in the digital camera 100 shown in FIG. 1.

The image shake correction device 3 comprises a movable member 2 movable in each of the directions X, Y, and θ, and a support member that supports the movable member 2 to be movable in each of the directions X, Y, and θ.

A circuit board 21 on which the imager 20 is fixed (mounted), an X-axis rotation drive coil C1, an X-axis rotation drive coil C2, and a Y-axis drive coil C3 are fixed to the movable member 2.

An X-axis position detection Hall element H1 that is a position detector for detecting a position of the movable member 2 in the direction X, and a Y-axis rotation position detection Hall element H2 and a Y-axis rotation position detection Hall element H3 which are position detectors for detecting positions of the movable member 2 in the direction Y and the direction θ are fixed to the circuit board 21.

Output signals of the X-axis position detection Hall element H1, the Y-axis rotation position detection Hall element H2, and the Y-axis rotation position detection Hall element H3 are input to the system controller 108.

The system controller 108 moves the movable member 2 by controlling a control current flowing through the X-axis rotation drive coil C1, a control current flowing through the X-axis rotation drive coil C2, and a control current flowing through the Y-axis drive coil C3 based on the output signals, and corrects the image shake.

The support member 1 includes a first support member 1A and a second support member 1B.

An X-axis rotation drive magnet Mv1, an X-axis rotation drive magnet Mv2, a Y-axis drive magnet Mv3, an X-axis position detection magnet Mh1, a Y-axis rotation position detection magnet Mh2, and a Y-axis rotation position detection magnet Mh3 are fixed to the first support member 1A.

The X-axis rotation drive magnet mv1, the X-axis rotation drive magnet mv2, and the Y-axis drive magnet mv3 are fixed to the second support member 1B.

FIG. 3 is a perspective view showing an appearance configuration of the image shake correction device 3 shown in FIGS. 1 and 2. FIG. 3 shows an appearance of the image shake correction device 3 in the reference state.

As shown in FIG. 3, the image shake correction device 3 comprises the support member 1 constituted by the first support member 1A and the second support member 1B and the movable member 2 to which the circuit board 21 on which the imager 20 is mounted is fixed. The movable member 2 is biased against the first support member 1A by springs 24a, 24b, and 24c which are elastic members.

The springs 24a, 24b, and 24c may be any springs that can urge the movable member 2 to the first support member 1A by an elastic force, and may be replaced with rubber which is an elastic member, for example.

This image shake correction device 3 is fixed to a main body of the digital camera 100 in a state in which the light receiving surface 20a faces the imaging optical system 101 shown in FIG. 1.

The image shake correction device 3 corrects the image shake by moving the movable member 2 in the direction θ using, as a center, a rotation axis R (an axis which is parallel to the gravity direction in the reference state) which is perpendicular to the light receiving surface 20a and passes through the center P of the light receiving surface 20a, the direction X which is the longitudinal direction of the light receiving surface 20a, and the direction Y which is the short direction of the light receiving surface 20a.

Hereinafter, a direction in which the rotation axis R extends is referred to as a direction Z. A flat surface perpendicular to the rotation axis R is a flat surface on which the movable member 2 moves.

The movable member 2 is movable in one direction (left direction) of the direction X and the other direction (right direction) of the direction X from the reference state by the same distance.

The movable member 2 is movable in one direction (up direction) of the direction Y and the other direction (down direction) of the direction Y from the reference state by the same distance.

The movable member 2 is rotatable in one direction (right rotation direction) of the direction θ and the other direction (left rotation direction) of the direction θ from the reference state by the same angle.

In the digital camera 100 shown in FIG. 1, a posture in which the direction Y shown in FIG. 3 is parallel to the gravity direction is a normal posture (a posture for performing so-called horizontal imaging).

Figure 4:
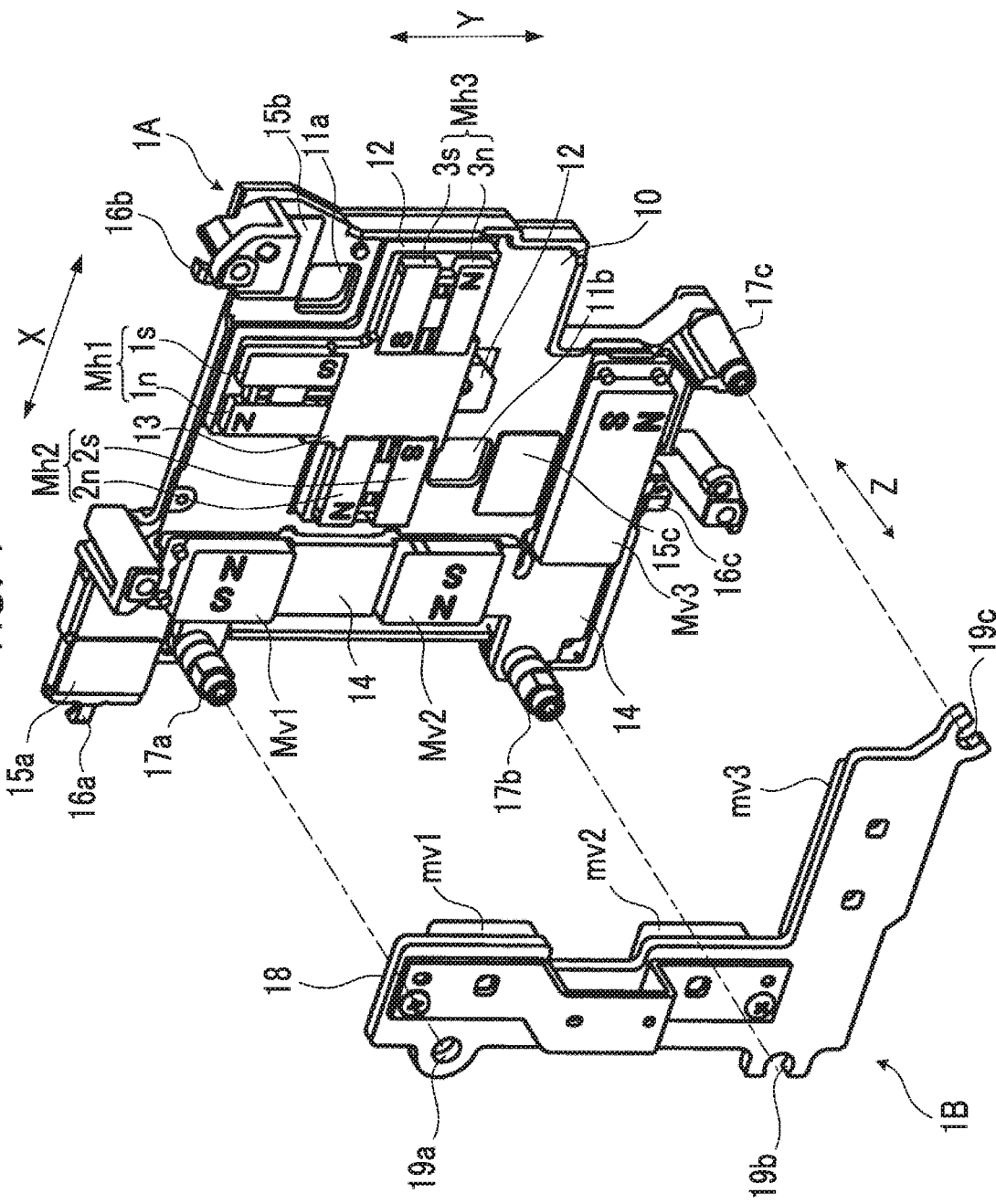
FIG. 4 is an exploded perspective view of a support member 1 in a case where the support member 1 in the image shake correction device 3 shown in FIG. 3 is viewed from an imaging optical system 101 side.

FIG. 4 is an exploded perspective view of the support member 1 in the image shake correction device 3 shown in FIG. 3 as viewed from the imaging optical system 101 side.

Figure 5:
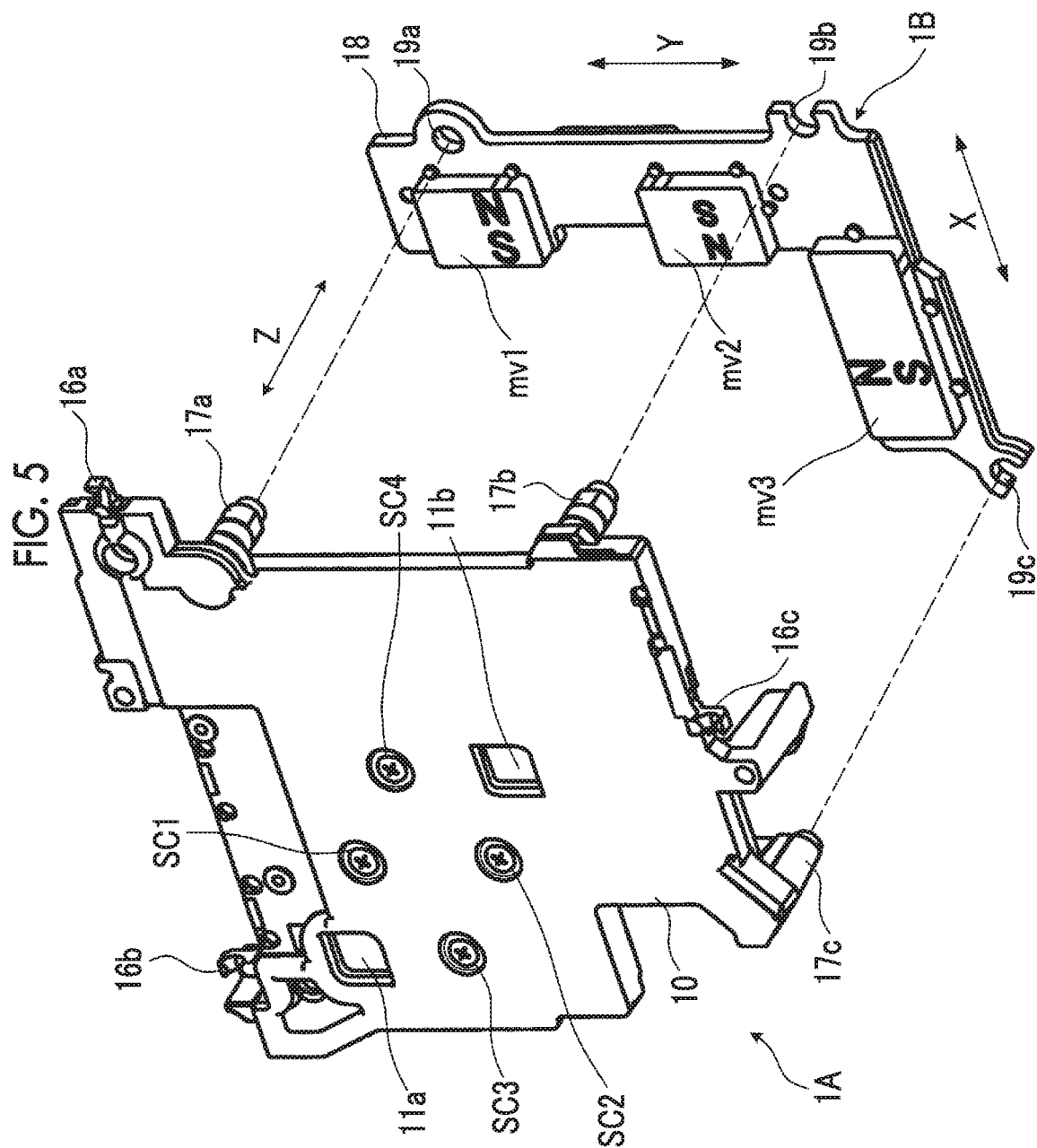
FIG. 5 is an exploded perspective view of the support member 1 shown in FIG. 4 as viewed from a side opposite to the imaging optical system 101 side.

FIG. 5 is an exploded perspective view of the support member 1 shown in FIG. 4 as viewed from a side opposite to the imaging optical system 101 side.

As shown in FIGS. 4 and 5, the first support member 1A comprises a plate-like base 10 that is made of resin and has a flat surface perpendicular to the direction Z, and projecting portions 17a, 17b, and 17c extending in the direction Z from a peripheral portion of the base 10 to the imaging optical system 101 side.

The second support member 1B has a substantially L-shaped yoke 18 as viewed from the imaging optical system 101 side. A hole portion 19a and notch portions 19b and 19c at positions facing the projecting portions 17a, 17b and 17c are formed at the yoke 18.

In a state in which the movable member 2 is disposed between the first support member 1A and the second support member 1B, the projecting portion 17a of the first support member 1A is fixed by being fitted into the hole portion 19a of the second support member 1B, the projecting portion 17b of the first support member 1A is fixed by being fitted into the notch portion 19b of the second support member 1B, and the projecting portion 17c of the first support member 1A is fixed by being fitted into the notch portion 19c of the second support member 1B. Accordingly, the movable member 2 is supported by the support member 1.

As shown in FIG. 4, substantially L-shaped yokes 14 as viewed from the imaging optical system 101 side are formed at a left end portion in the direction X and a lower end portion in the direction Y as viewed from the imaging optical system 101 side on a surface of the base 10 on the imaging optical system 101 side.

The X-axis rotation drive magnet Mv1 constituting a first drive magnet and the X-axis rotation drive magnet Mv2 constituting a second drive magnet are arranged and fixed on a front surface of portions of the yokes 14 of the first support member 1A that extends along the direction Y with a space in the direction Y.

As viewed from the imaging optical system 101 side, the X-axis rotation drive magnet Mv1 is disposed such that an N-pole faces the right direction of the direction X and an S-pole faces the left direction of the direction X.

As viewed from the imaging optical system 101 side, the X-axis rotation drive magnet Mv2 is disposed such that an N-pole faces the left direction of the direction X and an S-pole faces the right direction of the direction X.

The Y-axis drive magnet Mv3 constituting a third drive magnet is fixed on a front surface of a portion of the yoke 14 of the first support member 1A that extends along the direction X.

As viewed from the imaging optical system 101 side, the Y-axis drive magnet Mv3 is disposed such that an N-pole faces the down direction of the direction Y and an S-pole faces the up direction of the direction Y.

Figure 7:
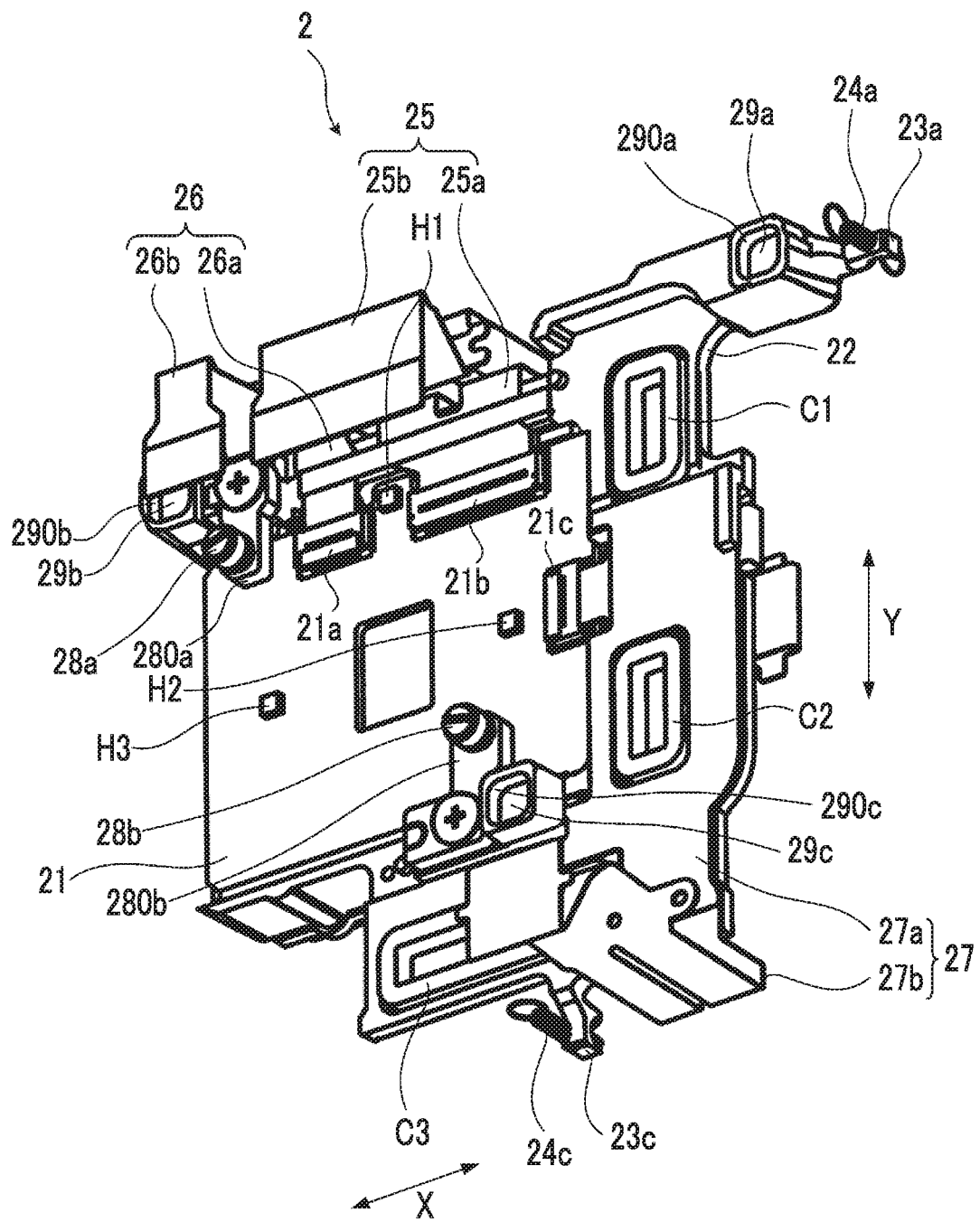
FIG. 7 is a perspective view of the movable member 2 shown in FIG. 6 as viewed from the side opposite to the imaging optical system 101 side.

As shown in FIG. 5, the X-axis rotation drive magnet mv1 is fixed on a front surface of the yoke 18 of the second support member 1B on the first support member 1A side at a position facing the X-axis rotation drive magnet Mv1 of the first support member 1A with the X-axis rotation drive coil C1 of the movable member 2 described in FIG. 7 interposed therebetween.

An S-pole of the X-axis rotation drive magnet mv1 faces the N-pole of the X-axis rotation drive magnet Mv1 with the X-axis rotation drive coil C1 interposed therebetween. An N-pole of the X-axis rotation drive magnet mv1 faces the S-pole of the X-axis rotation drive magnet Mv1 with the X-axis rotation drive coil C1 interposed therebetween.

Figure 6:
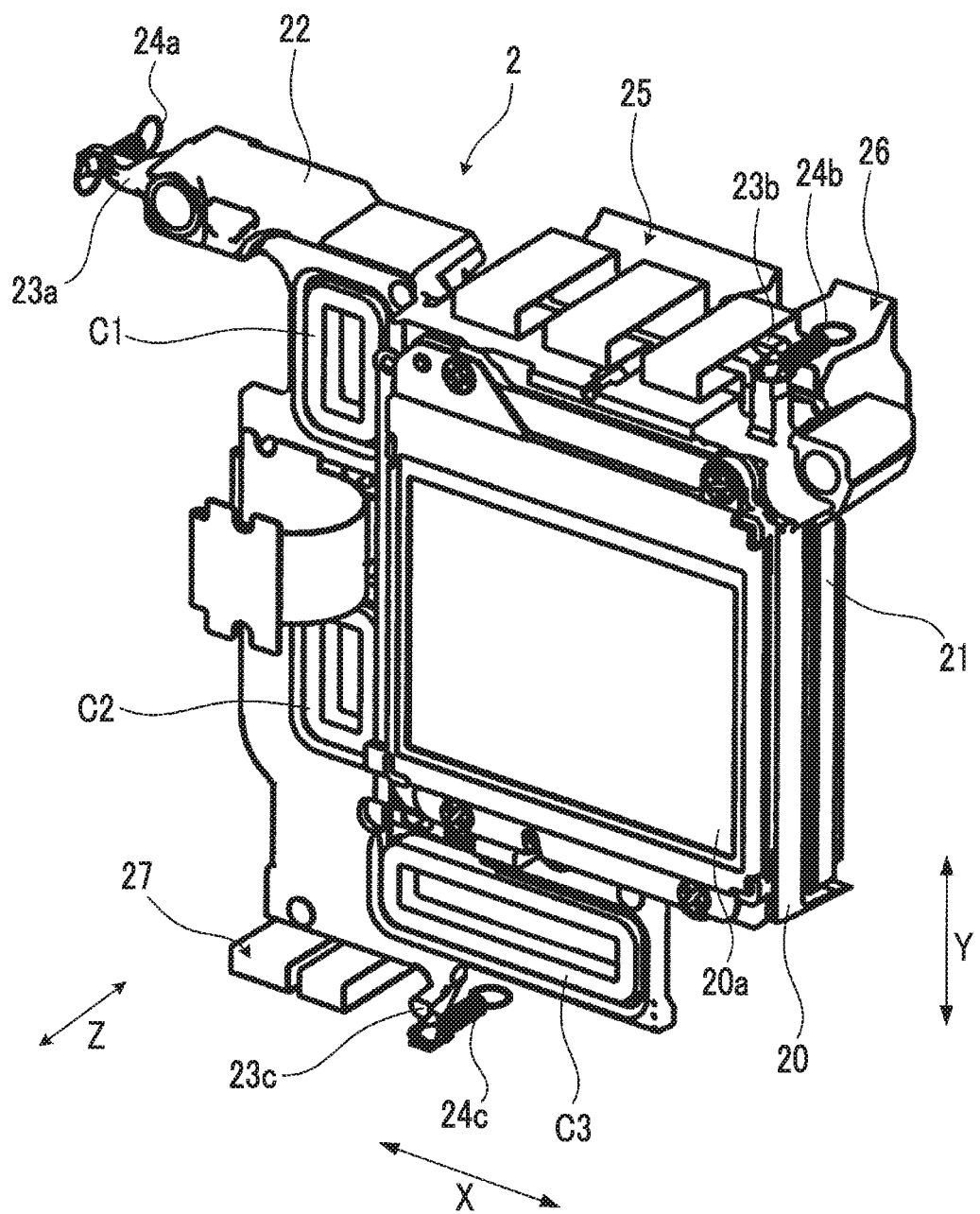
FIG. 6 is a perspective view of a movable member 2 in the image shake correction device 3 shown in FIG. 3 as viewed from the imaging optical system 101 side.
Figure 8:
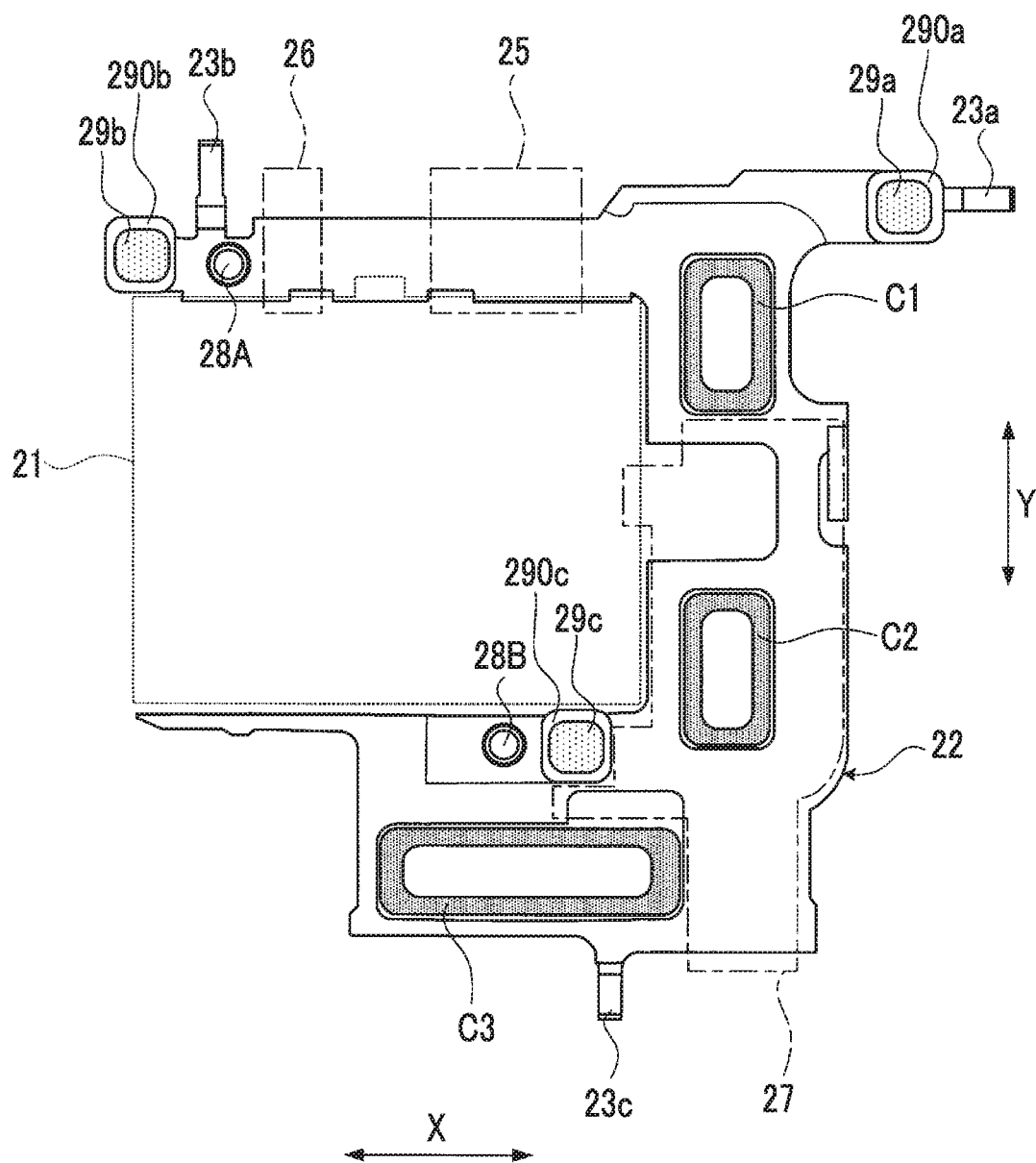
FIG. 8 is a plan view of the movable member 2 shown in FIG. 6 as viewed from the side opposite to the imaging optical system 101 side.

As shown in FIG. 5, the X-axis rotation drive magnet mv2 is fixed on a front surface of the yoke 18 of the second support member 1B on the first support member 1A side at a position facing the X-axis rotation drive magnet Mv2 of the first support member 1A with the X-axis rotation drive coil C2 of the movable member 2 described in FIGS. 6 to 8 interposed therebetween.

An S-pole of the X-axis rotation drive magnet mv2 faces the N-pole of the X-axis rotation drive magnet Mv2 with the X-axis rotation drive coil C2 interposed therebetween. An N-pole of the X-axis rotation drive magnet mv2 faces the S-pole of the X-axis rotation drive magnet Mv2 with the X-axis rotation drive coil C2 interposed therebetween.

As shown in FIG. 5, the Y-axis drive magnet mv3 is fixed on a front surface of the yoke 18 of the second support member 1B on the first support member 1A side at a position facing the Y-axis drive magnet Mv3 with the Y-axis drive coil C3 of the movable member 2 described in FIGS. 6 to 8 interposed therebetween.

An S-pole of the Y-axis drive magnet mv3 faces the N-pole of the Y-axis drive magnet Mv3 with the Y-axis drive coil C3 interposed therebetween. An N-pole of the Y-axis drive magnet mv3 faces the S-pole of the Y-axis drive magnet Mv3 with the Y-axis drive coil C3 interposed therebetween.

As shown in FIG. 4, substantially plus-shaped yokes 12 as viewed in the direction Z are formed at a portion facing the circuit board 21 fixed to the movable member 2 described in FIGS. 6 to 8 on a surface of the imaging optical system 101 side of the base 10 of the first support member 1A.

The X-axis position detection magnet Mh1 constituting a first position detection magnet is fixed on a front surface of the yoke 12 at a position facing the X-axis position detection Hall element H1 (see FIG. 7 to be described below) fixed to the circuit board 21 fixed to the movable member 2.

The X-axis position detection magnet Mh1 has an S-pole 1s and an N-pole 1n which are arranged with a space in the direction X, and the X-axis position detection Hall element H1 is disposed so as to face an intermediate position between the S-pole 1s and the N-pole 1n.

The N-pole 1n of the X-axis position detection magnet Mh1 is disposed on the left side in the direction X as viewed from the imaging optical system 101 side with respect to the S-pole 1s of the X-axis position detection magnet Mh1.

The Y-axis rotation position detection magnet Mh2 constituting a second position detection magnet is fixed on the front surface of the yoke 12 at a position facing the Y-axis rotation position detection Hall element H2 (see FIG. 7 to be described below) fixed to the circuit board 21 fixed to the movable member 2.

The Y-axis rotation position detection magnet Mh2 has an S-pole 2s and an N-pole 2n arranged with a space in the direction Y, and the Y-axis rotation position detection Hall element H2 is disposed so as to face an intermediate position between the S-pole 2s and the N-pole 2n.

The N-pole 2n of the Y-axis rotation position detection magnet Mh2 is disposed on the upper side of the direction Y as viewed from the imaging optical system 101 side with respect to the S-pole 2s of the Y-axis rotation position detection magnet Mh2.

The Y-axis rotation position detection magnet Mh3 constituting a third position detection magnet is fixed on the front surface of the yoke 12 at a position facing the Y-axis rotation position detection Hall element H3 (see FIG. 7 to be described below) fixed to the circuit board 21 fixed to the movable member 2.

The Y-axis rotation position detection magnet Mh3 has an S-pole 3s and an N-pole 3n arranged with a space in the direction Y, and the Y-axis rotation position detection Hall element H3 is disposed so as to face an intermediate position between the S-pole 3s and the N-pole 3n.

The N-pole 3n of the Y-axis rotation position detection magnet Mh3 is disposed on the lower side of the direction Y as viewed from the imaging optical system 101 side with respect to the S-pole 3s of the Y-axis rotation position detection magnet Mh3.

In the example shown in FIG. 4, the X-axis position detection magnet Mh1, the Y-axis rotation position detection magnet Mh2, and the Y-axis rotation position detection magnet Mh3 are coupled and integrated by a coupling member 13. Since the coupling member 13 is fixed to the yoke 12, the X-axis position detection magnet Mh1, the Y-axis rotation position detection magnet Mh2, and the Y-axis rotation position detection magnet Mh3 are fixed to the first support member 1A.

As shown in FIG. 5, the yoke 12 is fixed to the base 10 by screws SC1 to SC4 inserted from screw holes formed on a surface opposite to the imaging optical system 101 side of the base 10 of the first support member 1A.

The screw SC1 and the screw SC2 are respectively screwed into two screw holes formed so as to be arranged in the direction Y at a portion extending along the direction Y of the plus-shaped yoke 12.

The screw SC3 and the screw SC4 are respectively screwed into two screw holes formed so as to be arranged in the direction X at a portion extending along the direction X of the plus-shaped yoke 12.

As shown in FIG. 4, three flat surfaces 15a, 15b, and 15c perpendicular to the direction Z are formed on the surface of the imaging optical system 101 side of the base 10. The positions of the flat surfaces 15a, 15b, and 15c in the direction Z are all the same, and these flat surfaces are all formed on the same flat surface.

On the surface on the imaging optical system 101 side of the base 10, a through-hole 11a for restricting the movement of the movable member 2 is formed on an upper side in the direction Y from the Y-axis rotation position detection magnet Mh3, and a through-hole 11b for restricting the movement of the movable member 2 is formed on a lower side in the direction Y from the Y-axis rotation position detection magnet Mh2, as viewed from the imaging optical system 101 side.

A hook 16a extending in the direction X in which one end of the spring 24a shown in FIG. 3 is locked, a hook 16b extending in the up direction of the direction Y in which one end of the spring 24b shown in FIG. 3 is locked, and a hook 16c extending in the down direction of the direction Y in which one end of the spring 24c shown in FIG. 3 is locked are formed at a peripheral portion of the base 10.

FIG. 6 is a perspective view of the movable member 2 in the image shake correction device 3 shown in FIG. 3 as viewed from the imaging optical system 101 side.

FIG. 7 is a perspective view of the movable member 2 shown in FIG. 6 as viewed from the side opposite to the imaging optical system 101 side.

FIG. 8 is a plan view of the movable member 2 shown in FIG. 6 as viewed from the side opposite to the imaging optical system 101 side. In FIG. 8, in order to facilitate understanding of the configuration of the movable member 2, the circuit board 21 fixed to the movable member 2 is indicated by a broken line, and flexible print substrates 25, 26, and 27 connected to the circuit board 21 are indicated by imaginary lines.

As shown in FIG. 8, the movable member 2 comprises a substantially C-shaped base 22 constituted a straight-line-shaped portion extending in the direction X, a straight-line-shaped portion extending in the direction Y from a right end portion of this portion in the direction X, and a straight-line-shaped portion extending to the left side in the direction X from a lower end portion of a portion extending in the direction Y as viewed from the imaging optical system 101 side.

As shown in FIGS. 6 and 7, the circuit board 21 on which the imager 20 is mounted is fixed to the base 22 with an adhesive at a portion facing a region surrounded by the three portions.

As shown in FIGS. 6 to 8, the X-axis rotation drive coil C1 is formed at the base 22 at a position facing each of the X-axis rotation drive magnets Mv1 and mv1 shown in FIG. 4.

The X-axis rotation drive coil C2 is formed at the base 22 at a position facing each of the X-axis rotation drive magnets Mv2 and mv2 shown in FIG. 4.

The Y-axis drive coil C3 is formed at the base 22 at a position facing each of the Y-axis drive magnets Mv3 and mv3 shown in FIG. 4.

The X-axis rotation drive coil C1 shown in FIGS. 6 to 8 and the X-axis rotation drive magnets Mv1 and mv1 shown in FIG. 4 constitute an X-axis drive voice coil motor (VCM).

The X-axis drive VCM moves the movable member 2 in the direction X by electromagnetic induction between the X-axis rotation drive coil C1 and the X-axis rotation drive magnets Mv1 and mv1 by causing a control current to flow through the X-axis rotation drive coil C1.

The X-axis rotation drive coil C2 shown in FIGS. 6 to 8 and the X-axis rotation drive magnets Mv2 and mv2 shown in FIG. 4 constitute a VCM. This VCM and the X-axis drive VCM constitute a rotation drive VCM.

The rotation drive VCM rotates the movable member 2 around the rotation axis R with the center P of the light receiving surface 20a with a rotation center by an electromagnetic induction action between the X-axis rotation drive coil C1 and the X-axis rotation drive magnets Mv1 and mv1 and an electromagnetic induction between the X-axis rotation drive coil C2 and the X-axis rotation drive magnets Mv2 and mv2 by reversing the directions of the control currents flowing through the X-axis rotation drive coil C1 and the X-axis rotation drive coil C2 shown in FIGS. 6 to 8.

The Y-axis drive coil C3 shown in FIGS. 6 to 8 and the Y-axis drive magnets Mv3 and mv3 shown in FIG. 4 constitute a Y-axis drive VCM.

The Y-axis drive VCM moves the movable member 2 in the direction Y by an electromagnetic induction between the Y-axis drive coil C3 and the Y-axis drive magnets Mv3 and mv3 by causing the control current to flow through the Y-axis drive coil C3.

As shown in FIG. 7, the X-axis position detection Hall element H1 is fixed at a position facing the intermediate position between the S-pole 1s and the N-pole 1n of the X-axis position detection magnet Mh1 on a surface of the first support member 1A side of the circuit board 21 fixed to the base 22 (hereinafter, referred to as a rear surface of the circuit board 21).

The Y-axis rotation position detection Hall element H2 is fixed at a position facing the intermediate position between the S-pole 2s and the N-pole 2n of the Y-axis rotation position detection magnet Mh2 on the rear surface of the circuit board 21.

The Y-axis rotation position detection Hall element H3 is fixed at a position facing the intermediate position between the S-pole 3s and the N-pole 3n of the Y-axis rotation position detection magnet Mh3 on the rear surface of the circuit board 21.

The X-axis position detection Hall element H1 outputs a signal corresponding to a magnetic field supplied from the X-axis position detection magnet Mh1, and the system controller 108 detects a position of the movable member 2 in the direction X by an output change of this signal.

The Y-axis rotation position detection Hall element H2 outputs a signal corresponding to a magnetic field supplied from the Y-axis rotation position detection magnet Mh2, and the system controller 108 detects a position of the movable member 2 in the direction Y by an output change of this signal.

The Y-axis rotation position detection Hall element H3 outputs a signal corresponding to a magnetic field supplied from the Y-axis rotation position detection magnet Mh3.

The system controller 108 detects, as a position of the movable member 2 in the direction θ, a rotation angle of the movable member 2 around the rotation axis R due to the change of the output signal of the Y-axis rotation position detection Hall element H3 and the change of the output signal of the Y-axis rotation position detection Hall element H2.

Figure 9:
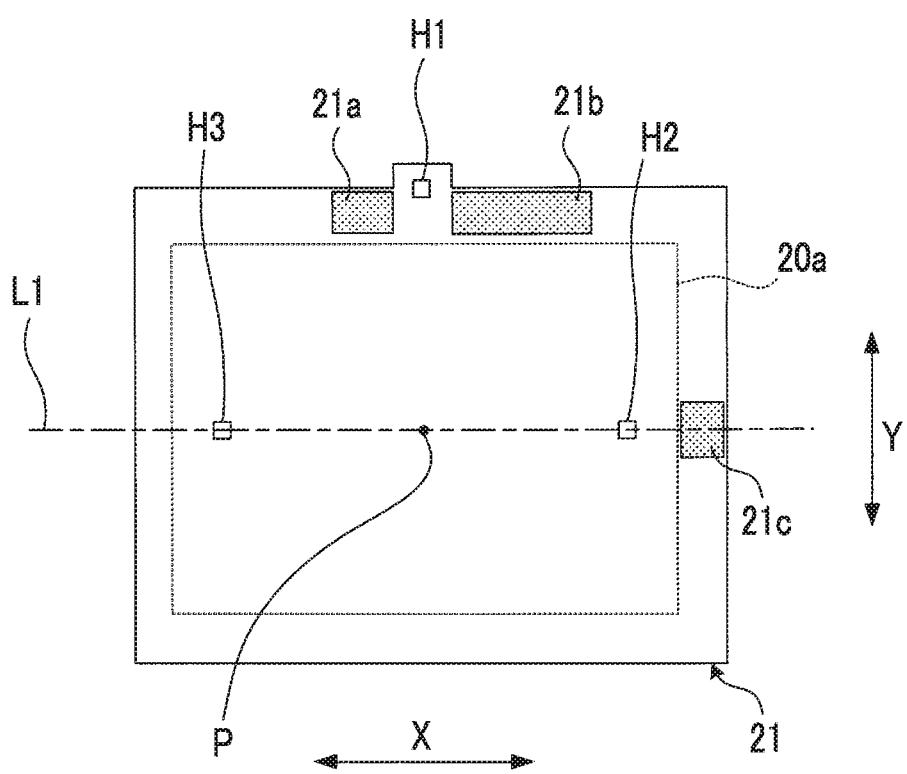
FIG. 9 is a diagram showing a state in which a rear surface of a circuit board 21 fixed to the movable member 2 shown in FIG. 7 is viewed in a direction Z.

FIG. 9 is a diagram showing a state in which the rear surface of the circuit board 21 fixed to the base 22 of the movable member 2 shown in FIG. 7 is viewed in the direction Z.

In FIG. 9, the center P of the light receiving surface 20a of the imager 20 that overlaps the rear surface of the circuit board 21 is shown. In FIG. 9 a straight line L1 which passes through the center P and is parallel to the direction X, and the Y-axis rotation position detection Hall element H2 and the Y-axis rotation position detection Hall element H3 are arranged on the straight line L1. A distance from the Y-axis rotation position detection Hall element H2 to the center P and a distance from the Y-axis rotation position detection Hall element H3 to the center P are the same.

As shown in FIG. 4, the Y-axis rotation position detection magnet Mh2 facing the Y-axis rotation position detection Hall element H2 and the Y-axis rotation position detection magnet Mh3 facing the Y-axis rotation position detection Hall element H3 are arranged such that magnetic poles are opposite to each other in the direction Y.

In a case where the movable member 2 rotates in the right direction of the direction θ as viewed from the imaging optical system 101 side, the Y-axis rotation position detection Hall element H2 and the Y-axis rotation position detection Hall element H3 move in opposite directions to each other in the direction Y by the same distance. Thus, the outputs of the Y-axis rotation position detection Hall element H2 and the Y-axis rotation position detection Hall element H3 are changed in the same manner.

The output signal of the Y-axis rotation position detection Hall element H2 output signal, the movement direction and the movement distance of the Y-axis rotation position detection Hall element H2, the output signal of the Y-axis rotation position detection Hall element H3, the movement direction and the movement distance of the Y-axis rotation position detection Hall element H3, and the rotation angle of the movable member 2 in the direction θ are associated with each other in advance, and thus, it is possible to detect the rotation position of the movable member 2 in the direction θ by the output signals of the Y-axis rotation position detection Hall element H2 and the Y-axis rotation position detection Hall element H3.

Meanwhile, in a case where the movable member 2 moves only in the direction Y, the Y-axis rotation position detection Hall element H2 and the Y-axis rotation position detection Hall element H3 move in the same direction in the direction Y by the same distance.

Thus, the output signals of the Y-axis rotation position detection Hall element H2 and the Y-axis rotation position detection Hall element H3 are changed in opposite directions.

Therefore, in a case where the outputs of the Y-axis rotation position detection Hall element H2 and the Y-axis rotation position detection Hall element H3 are changed in opposite directions, it is possible to detect the position of the movable member 2 in the direction Y by viewing the output of the Y-axis rotation position detection Hall element H2 or the Y-axis rotation position detection Hall element H3.

As shown in FIGS. 6 to 8, a hook 23a extending in the same direction (direction X) as the hook 16a is formed at the base 22 at a position facing the hook 16a (see FIG. 4) of the support member 1. The other end of the spring 24a shown in FIG. 3 is locked to the hook 23a.

The movable member 2 is biased toward the first support member 1A by the spring 24a locked to the hooks 16a and 23a.

As shown in FIGS. 6 and 8, a hook 23b extending in the same direction (up direction of the direction Y) as the hook 16b is formed at the base 22 at a position facing the hook 16b (see FIG. 4) of the support member 1. The other end of the spring 24b shown in FIG. 3 is locked to the hook 23b.

The movable member 2 is biased toward the first support member 1A by the spring 24b locked to the hooks 16b and 23b.

As shown in FIGS. 6 to 8, a hook 23c extending in the same direction (down direction of the direction Y) as the hook 16c is formed at the base 22 at a position facing the hook 16c (see FIG. 4) of the support member 1. The other end of the spring 24c shown in FIG. 3 is locked to the hook 23c.

The movable member 2 is biased toward the first support member 1A by the spring 24c locked to the hooks 16c and 23c.

The pair of the hook 16a and the hook 23a, the pair of the hook 16b and the hook 23b, and the pair of the hook 16c and the hook 23c are formed such that a center of gravity of the movable member 2 is disposed inside a triangle formed by connecting these three pairs in plan view viewed in the direction Z.

As shown in FIGS. 7 and 8, a recess portion 290a that accommodates a rolling element (spherical ball) for causing the movable member 2 to be movable on a surface perpendicular to the direction Z at a position facing the flat surface 15a of the first support member 1A shown in FIG. 4 is formed at the base 22. A bottom surface 29a of the recess portion 290a is a flat surface perpendicular to the direction Z.

A recess portion 290b that accommodates a rolling element for causing the movable member 2 to be movable on the surface perpendicular to the direction Z at a position facing the flat surface 15b of the first support member 1A shown in FIG. 4 is formed at the base 22. A bottom surface 29b of the recess portion 290b is a flat surface perpendicular to the direction Z.

A recess portion 290c that accommodates a rolling element for causing the movable member 2 to be movable on the surface perpendicular to the direction Z is formed at the base 22 at a position facing the flat surface 15c of the first support member 1A shown in FIG. 4. A bottom surface 29c of the recess portion 290c is a flat surface perpendicular to the direction Z.

The positions of the bottom surfaces 29a, 29b, and 29c in the direction Z are all the same, and the bottom surfaces are all formed on the same flat surface.

The movable member 2 moves on the flat surface perpendicular to the direction Z by rolling the rolling elements disposed between the bottom surface 29a of the movable member 2 and the flat surface 15a of the first support member 1A, between the bottom surface 29b of the movable member 2 and the flat surface 15b of the first support member 1A, and between the bottom surface 29c of the movable member 2 and the flat surface 15c of the first support member 1A.

As shown in FIG. 8, an attachment portion 28A is formed on the surface of the first support member 1A side of the base 22. As shown in FIG. 7, a flat plate portion 280a extending in the down direction of the direction Y at a position overlapping the circuit board 21 is fixed to the attachment portion 28A with screws. An insertion member 28a protruding in the direction Z toward the first support member 1A side is formed at the flat plate portion 280a.

As shown in FIG. 8, an attachment portion 28B is formed on the surface of the first support member 1A side of the base 22. As shown in FIG. 7, a flat plate portion 280b extending in the up direction of the direction Y at a position overlapping the circuit board 21 is fixed to the attachment portion 28B with screws. An insertion member 28b protruding in the direction Z toward the first support member 1A side is formed at the flat plate portion 280b.

The insertion member 28a is inserted into the through-hole 11a of the first support member 1A shown in FIG. 4. The insertion member 28b is inserted into the through-hole 11b of the first support member 1A shown in FIG. 4.

In a case where the movable member 2 moves on the surface perpendicular to the direction Z, the movement range of the insertion member 28a is limited to the inside of the through-hole 11a, and the movement range of the insertion member 28b is limited to the inside of the through-hole 11b. Thus, the movement range of the movable member 2 (the movement range in the direction X, the movement range in the direction Y, and the movement range in the direction θ) is restricted to a predetermined range by the pair of the insertion member 28a and the through-hole 11a and the pair of the insertion member 28b and the through-hole 11b.

The pair of the insertion member 28a and the through-hole 11a constitutes a movement restriction unit MR1 (see FIG. 12 to be described below) that restricts the movement range of the movable member 2. The pair of the insertion member 28b and the through-hole 11b constitutes a movement restriction unit MR2 (see FIG. 12 to be described below) that restricts the movement range of the movable member 2.

As shown in FIG. 7, a connector 21a and a connector 21b are formed at an upper end portion of the rear surface of the circuit board 21 fixed to the movable member 2 in the direction Y. A connector 21c is formed at an end portion on a side close to the base 22 among the end portions on the rear surface of the circuit board 21 in the direction X.

The connector 21a and the connector 21b include terminals connected to various terminals (a power supply terminal which is a terminal for supplying a power, a ground terminal which is a terminal for grounding, a terminal for outputting a signal, and a drive terminal) of the imager 20 mounted on the circuit board 21.

The flexible print substrate 26 which is a first flexible substrate including wirings connected to the terminals included in the connectors is connected to the connector 21a.

The flexible print substrate 25 which is a first flexible substrate including wirings connected to the terminals included in the connectors is connected to the connector 21b.

The connector 21c includes terminals connected to output terminals of the X-axis position detection Hall element H1, the Y-axis rotation position detection Hall element H2, and the Y-axis rotation position detection Hall element H3 mounted on the rear surface of the circuit board 21.

The flexible print substrate 27 which is a second flexible substrate including wirings connected to the terminals included in the connector is connected to the connector 21c.

The flexible print substrate 27 includes a fixed portion 27a that extends along the direction Y and is fixed to the base 22, and a non-fixed portion 27b that is free with respect to the base 22.

A movable unit is constituted by the movable member 2 that includes the X-axis rotation drive coil C1, the X-axis rotation drive coil C2, and the Y-axis drive coil C3, the imager 20, the circuit board 21 that includes the X-axis position detection Hall element H1, the Y-axis rotation position detection Hall element H2, and the Y-axis rotation position detection Hall element H3, and the flexible print substrates 25 to 27 connected to the circuit board 21. The movable support device is constituted by the movable unit and the support member 1.

Figure 10:
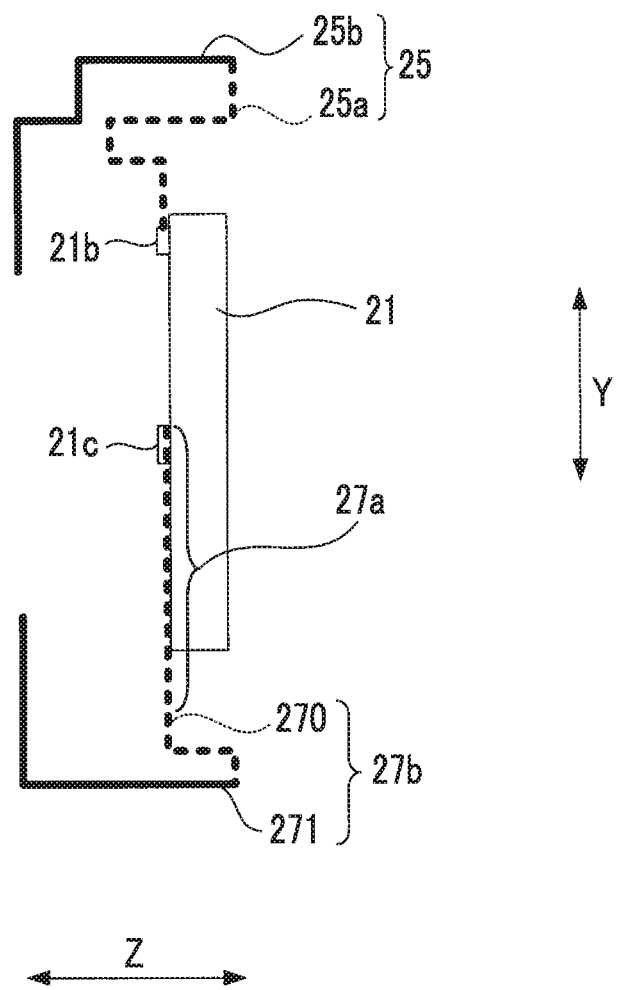
FIG. 10 is a side view showing a state in which the circuit board 21 fixed to the movable member 2 shown in FIG. 6 and a flexible print substrate connected to the circuit board are viewed in a direction X.

FIG. 10 is a side view showing of the circuit board 21 fixed to the movable member 2 shown in FIG. 6 and the flexible print substrate connected to the circuit board as viewed in the direction X. In FIG. 10, a part of the flexible print substrates is shown by a broken line in order to facilitate understanding.

As shown in FIGS. 10 and 7, the flexible print substrate 25 includes a first portion 25a (broken line portion) extending in the up direction of the direction Y from the connector 21b and a folded portion 25b (solid line portion) folded in the down direction of the direction Y at an end portion of the first portion 25a.

Although not shown in FIG. 10, the flexible print substrate 26 has the same configuration as that of the flexible print substrate 25, and includes a first portion 26a extending in the up direction of the direction Y from the connector 21a and a folded portion 26b folded in the down direction of the direction Y at an end portion of the first portion 26a, as shown in FIG. 7.

As shown in FIGS. 10 and 7, the flexible print substrate 27 includes a fixed portion 27a which is fixed to the base 22, and includes a second portion 270 (broken line portion) which extends in the down direction of the direction Y, and a folded portion 271 (solid line portion) folded in the up direction of the direction Y at an end portion of the second portion 270.

The non-fixed portion 27b shown in FIG. 7 is constituted by a portion excluding the fixed portion 27a of the second portion 270 and the folded portion 271.

A distal end of the folded portion 25b, a distal end of the folded portion 26b, and a distal end of the folded portion 271 are connected to a connector of a main substrate (a substrate on which the system controller 108 is formed) (not shown) in the digital camera 100.

Next, details of the arrangement of the magnets fixed to the first support member 1A shown in FIG. 4 will be described.

Figure 11:
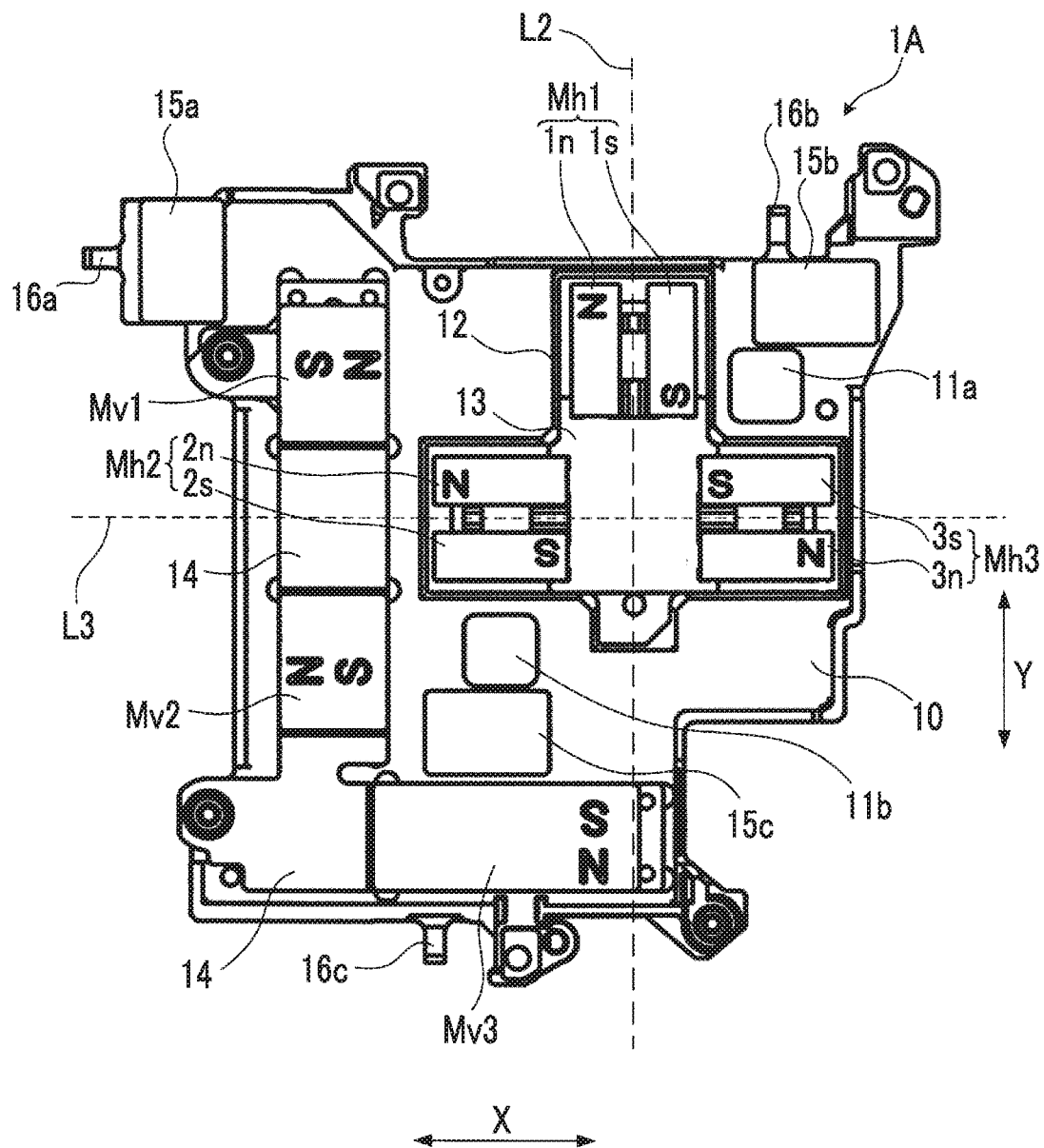
FIG. 11 is a front view of a first support member 1A shown in FIG. 4 as viewed from the imaging optical system 101 side.

FIG. 11 is a front view of the first support member 1A shown in FIG. 4 as viewed in the direction Z from the imaging optical system 101 side.

In the image shake correction device 3, six magnets are fixed to the base 10 of the first support member 1A, as shown in FIG. 11. Thus, the arrangement of the magnets is devised such that the magnetic fields of these six magnets do not influence the magnetic fields of the other magnets.

Specifically, in a case where two adjacent magnets among all the magnets (the X-axis rotation drive magnet Mv1, the X-axis rotation drive magnet Mv2, the Y-axis drive magnet Mv3, the X-axis position detection magnet Mh1, the Y-axis rotation position detection magnet Mh2, and the Y-axis rotation position detection magnet Mh3) fixed to the first support member 1A are focused, the same poles of the two magnets face each other.

In a case where two magnets are adjacent to each other, in the front view of FIG. 11, a length of the shortest line segment connecting the peripheral edges of the two magnets is short to the extent that the magnetic field of one of the two magnets influences the magnetic field of the other magnet.

In the example shown in FIG. 11, the X-axis rotation drive magnet Mv1 and the Y-axis rotation position detection magnet Mh2 are adjacent to each other, and the N-pole $2n$ of the X-axis rotation drive magnet Mv1 and the N-pole $2n$ of the Y-axis rotation position detection magnet Mh2 face each other.

In the example shown in FIG. 11, the X-axis position detection magnet Mh1 and the Y-axis rotation position detection magnet Mh3 are adjacent to each other, and the S-pole $1s$ of the X-axis position detection magnet Mh1 and the S-pole $3s$ of the Y-axis rotation position detection magnet Mh3 face each other.

In the example shown in FIG. 11, the X-axis position detection magnet Mh1 and the Y-axis rotation position detection magnet Mh2 are adjacent to each other, and the N-pole $1n$ of the X-axis position detection magnet Mh1 and the N-pole $2n$ of the Y-axis rotation position detection magnet Mh2 face each other.

In the example shown in FIG. 11, the Y-axis rotation position detection magnet Mh2 and the X-axis rotation drive magnet Mv2 are adjacent to each other, and the S-pole $2s$ of the X-axis rotation driving of the Y-axis rotation position detection magnet Mh2 and the S-pole of the X-axis rotation drive magnet Mv2 face each other.

In the example shown in FIG. 11, the X-axis rotation drive magnet Mv2 and the Y-axis drive magnet Mv3 are adjacent to each other, and the S-pole of the X-axis rotation drive magnet Mv2 and the S-pole of the Y-axis drive magnet Mv3 Are face each other.

The image shake correction device 3 detects the rotation position of the movable member 2 in the direction θ by the two magnets of the Y-axis rotation position detection magnet Mh2 and the Y-axis rotation position detection magnet Mh3 and the Y-axis rotation position detection Hall element H2 and the Y-axis rotation position detection Hall element H3 facing the two magnets.

Thus, it is important to uniformize the detection accuracy of the Y-axis rotation position detection Hall element H2 and the Y-axis rotation position detection Hall element H3. The changes of the output signals of the Y-axis rotation position detection Hall element H2 and the Y-axis rotation position detection Hall element H3 in a case where the movable member 2 is rotated need to be equal.

Therefore, as shown in FIG. 11, the Y-axis rotation position detection magnet Mh2 and the Y-axis rotation position detection magnet Mh3 are arranged symmetrically with respect to a straight line L2 that passes through the center P of the light receiving surface 20a of the imager 20 and extends in the direction Y.

The N-pole 2n and the S-pole 2s of the Y-axis rotation position detection magnet Mh2 are arranged symmetrically with respect to a straight line L3 that passes through the center P of the light receiving surface 20a of the imager 20 and extends in the direction X. The N-pole 3n and the S-pole 3s of the Y-axis rotation position detection magnet Mh3 are arranged symmetrically with respect to the straight line L3.

Distances between the N-pole 2n and the S-pole 2s and the straight line L3 and distances between the N-pole 3n and the S-pole 3s and the straight line L3 are all the same.

In order to uniformize the influence of the magnetic field of the X-axis position detection magnet Mh1 on the magnetic field of the Y-axis rotation position detection magnet Mh2 and the magnetic field of the Y-axis rotation position detection magnet Mh3, the S-pole is and the N-pole 1n of the X-axis position detection magnet Mh1 are arranged symmetrically with respect to the straight line L2.

In order to prevent the magnetic field of the Y-axis drive magnet Mv3 from influencing the magnetic field of the X-axis position detection magnet Mh1, the X-axis position detection magnet Mh1 is disposed on the up direction side of the direction Y with respect to the straight line L3, and the Y-axis drive magnet Mv3 is disposed on the down direction side of the direction Y with respect to the straight line L3.

In order to reduce the influence of the magnetic fields of the X-axis rotation drive magnet Mv1 and the X-axis rotation drive magnet Mv2 on the magnetic field of the Y-axis rotation position detection magnet Mh2, the X-axis rotation drive magnet Mv1 and the X-axis rotation drive magnet Mv2 are arranged symmetrically with respect to the straight line L3.

In order to uniformize rotation drive forces in one direction and the other direction of the direction θ of the movable member 2, the X-axis rotation drive magnet Mv1 and the X-axis rotation drive magnet Mv2 have the same configuration.

Meanwhile, in a case where the digital camera 100 is in the normal posture (the posture in which the direction Y and the gravity direction are parallel), the Y-axis drive magnet Mv3 having a plane area greater than each of the X-axis rotation drive magnet Mv1 and the X-axis rotation drive magnet Mv2 is used in order to obtain a sufficient drive force for moving the movable member 2 against the gravity applied to the movable member 2.

The X-axis rotation drive magnet Mv1, the X-axis rotation drive magnet Mv2, and the Y-axis drive magnet Mv3 need a large magnetic force in order to move the movable member 2.

Thus, it is preferable that thicknesses of the X-axis rotation drive magnet Mv1, the X-axis rotation drive magnet Mv2, and the Y-axis drive magnet Mv3 are greater than thicknesses of the position detection magnets (the X-axis position detection magnet Mh1, the Y-axis rotation position detection magnet Mh2, and the Y-axis rotation position detection magnet Mh3) of the movable member 2.

In the image shake correction device 3 having the aforementioned configuration, the drive magnets (the X-axis rotation drive magnet Mv1, the X-axis rotation drive magnet Mv2, and the Y-axis drive magnet Mv3) of the movable member 2 and the position detection magnets (the X-axis position detection magnet Mh1, the Y-axis rotation position detection magnet Mh2, and the Y-axis rotation position detection magnet Mh3) of the movable member 2 are individually provided. Thus, the position detection accuracy of the movable member 2 can be improved.

In a case where two adjacent magnets among the six magnets fixed to the first support member 1A are focused, the same poles of the two magnets face each other. Thus, the same poles of the two adjacent magnets do not attract each other, and a decrease in the magnetic force of each of the two magnets can be prevented.

As described above, according to the image shake correction device 3, decreases in the magnetic forces of the drive magnets (the X-axis rotation drive magnet Mv1, the X-axis rotation drive magnet Mv2, and the Y-axis drive magnet Mv3) of the movable member 2 can be prevented.

It is possible to stabilize the magnetic fields applied to the X-axis rotation drive coil C1, the Y-axis drive coil C3, and the X-axis rotation drive coil C2, and it is possible to improve the drive performance of the movable member 2.

According to the image shake correction device 3, it is possible to prevent decreases of the magnetic forces of the position detection magnets (the X-axis position detection magnet Mh1, the Y-axis rotation position detection magnet Mh2, and the Y-axis rotation position detection magnet Mh3) of the movable member 2.

Thus, it is possible to stabilize the magnetic fields applied to the X-axis position detection Hall element H1, the Y-axis rotation position detection Hall element H2, and the Y-axis rotation position detection Hall element H3, and it is possible to improve the position detection accuracy of the movable member 2.

In the image shake correction device 3, the movable member 2 is driven such that the position of the movable member 2 becomes a desired position. Thus, the improvement of the position detection accuracy of the movable member 2 is particularly important for improving the image shake correction performance.

In the image shake correction device 3, the Y-axis rotation position detection magnet Mh2 and the Y-axis rotation position detection magnet Mh3 are arranged symmetrically with respect to the straight line L2, and the Y-axis rotation position detection magnets Mh2 and Mh3 are arranged such that two magnetic poles are symmetrically with respect to the straight line L3.

Therefore, it is possible to uniformize the detection accuracy of the Y-axis rotation position detection Hall element H2 and the Y-axis rotation position detection Hall element H3, and it is possible to uniformize the changes of the output signals of the Y-axis rotation position detection Hall element H2 and the Y-axis rotation position detection Hall element H3 in a case where the movable member 2 is rotated.

In the image shake correction device 3, the two magnetic poles of the X-axis position detection magnet Mh1 are arranged symmetrically with respect to the straight line L2. Thus, the influence of the magnetic field of the X-axis position detection magnet Mh1 on the magnetic field of the Y-axis rotation position detection magnet Mh2 and the magnetic field of the Y-axis rotation position detection magnet Mh3 can be uniformized.

Due to these effects, it is possible to improve the position detection accuracy (particularly the detection accuracy of the rotation position in the direction θ) of the movable member 2.

In the image shake correction device 3, the X-axis position detection magnet Mh1 is disposed on the up direction side in the direction Y with respect to the straight line L3, and the Y-axis drive magnet Mv3 is disposed on the down direction side in the direction Y with respect to the straight line L3.

Thus, it is possible to prevent the magnetic field of the Y-axis drive magnet Mv3 from influencing the magnetic field of the X-axis position detection magnet Mh1. As a result, the position detection accuracy of the movable member 2 can be improved.

In the image shake correction device 3, the X-axis rotation drive magnet Mv1 and the X-axis rotation drive magnet Mv2 are arranged symmetrically with respect to the straight line L3. Thus, it is possible to reduce the influence of the magnetic fields of the X-axis rotation drive magnet Mv1 and the X-axis rotation drive magnet Mv2 on the magnetic field of the Y-axis rotation position detection magnet Mh2. As a result, the position detection accuracy of the movable member 2 can be improved.

In the image shake correction device 3, the plane area of the Y-axis drive magnet Mv3 is greater than the plane areas of the X-axis rotation drive magnet Mv1 and the X-axis rotation drive magnet Mv2. Thus, in a state in which the digital camera 100 is in the normal posture, the drive force in the direction Y of the movable member 2 can be sufficiently secured.

The position detection magnets (the X-axis position detection magnet Mh1, the Y-axis rotation position detection magnet Mh2, and the Y-axis rotation position detection magnet Mh3) of the movable member 2 of the image shake correction device 3 are arranged such that the S-poles and the N-poles are arranged with a space.

The S-poles and the N-poles of the X-axis position detection magnet Mh1, the Y-axis rotation position detection magnet Mh2, and the Y-axis rotation position detection magnet Mh3 may be integrated. However, the S-pole and the N-pole are separated, and thus, the position detection accuracy by the Hall elements can be improved. A range in which the position of the Hall element can be detected can be widened.

Although the image shake correction device 3 performs the image shake correction by moving the movable member 2 in three directions, that is, the direction X, the direction Y, and the direction θ, it is possible to improve the position detection accuracy and the drive performance by arranging the same poles of the two adjacent magnets so as to face each other as described above even though the image shake correction is performed by moving the movable member 2 in two directions of the direction X and the direction Y.

For example, in a case where the image shake correction device 3 does not to move the movable member 2 in the direction θ, the pair of the Y-axis rotation position detection magnet Mh2 and the Y-axis rotation position detection Hall element H2 may be removed, and the pair of the X-axis rotation drive magnet Mv1 and the X-axis rotation drive coil C1 may be removed.

In this configuration, the X-axis rotation drive magnet Mv2 functions as the first drive magnet, the Y-axis rotation drive magnet Mv3 functions as the second drive magnet, the X-axis position detection magnet Mh1 functions as the first position detection magnet, and the Y-axis rotation position detection magnet Mh3 functions as the second position detection magnet.

Even in this configuration, the same poles of the two adjacent magnets are arranged to face each other, and thus, the influence of each magnet on the magnetic field of the other magnet is reduced. Accordingly, it is possible to improve the position detection accuracy and drive performance.

The image shake correction device 3 has a configuration in which the magnets are fixed to the first support member 1A and the drive coils and the position detectors facing the magnets are fixed to the movable member 2. However, the effects described above can be similarly obtained even in the configuration in which the magnets are fixed to the movable member 2, and the X-axis rotation drive coil C1, the X-axis rotation drive coil C2, the Y-axis drive coil C3, the X-axis position detection Hall element H1, the Y-axis rotation position detection Hall element H2, and the Y-axis rotation position detection Hall element H3 are fixed to the first support member 1A.

Although the image shake correction device 3 corrects image shake by moving the imager 20, the arrangement of the magnets is effective even in the device that corrects image shake by moving the lens included in the imaging optical system 101. Specifically, in the image shake correction device having the movable member to which the lens is fixed and the support member that supports the movable member to be movable, the arrangement of the plurality of drive magnets and the plurality of position detection magnets fixed to any of the movable member and the support member may be the arrangement in which the same poles of the two adjacent magnets face each other, as shown in FIG. 11.

As shown in FIGS. 7, 8, and 10, in the image shake correction device 3, the flexible print substrate 25 and the flexible print substrate 26 are drawn in the up direction of the direction Y and then is folded in the down direction of the direction after upward in the direction Y, and the flexible print substrate 27 is drawn in the down direction of the direction Y and then is folded in the up direction of the direction Y.

For example, the widths or thicknesses of the flexible print substrates 25 to 27 are adjusted such that the total of the elastic force applied to the movable member 2 from the flexible print substrate 25 and the flexible print substrate 26 toward the down direction of the direction Y and the gravity applied to the movable member 2 in a case where the digital camera 100 is in the normal posture is the same as the elastic force applied to the movable member 2 from the flexible print substrate 27 toward the up direction of the direction Y.

By doing this, in a case where the digital camera 100 is in the normal posture, the power for holding the movable member 2 at a position of a reference posture can be reduced.

In the image shake correction device 3, it is preferable that the flexible print substrate 25 and the flexible print substrate 26 include wirings connected to terminals other than the power supply terminal and the ground terminal among the terminals of the imager 20 and the flexible print substrate 27 includes wirings (power supply line and ground line) connected to the power supply terminal and the ground terminal among the terminals of the imager 20.

The flexible print substrate having a less thickness can have a lower elastic force. However, it is necessary to increase the widths of the power supply line and the ground line in order to reduce the thicknesses. Meanwhile, in a case where the width of the flexible print substrate is increased, the spring multiplier of the flexible print substrate is increased.

According to the aforementioned preferred configuration, the flexible print substrate 25 and the flexible print substrate 26 do not include the power supply line and the ground line, and thus, the widths of the flexible print substrate 25 and the flexible print substrate 26 are not increased. As a result, the flexible print substrate 25 and the flexible print substrate 26 are thinned, and thus, it is possible to reduce the elastic force of the flexible print substrate 25 and the flexible print substrate 26.

As described above, the elastic force of the flexible print substrate 25 and the flexible print substrate 26 is reduced, and thus, the elastic force of the flexible print substrate 27 necessary for canceling the resultant force of the elastic force and the gravity can be reduced.

As a result, degrees of freedom in designing the flexible print substrates 25 to 27 are increased, and thus, the manufacturing cost of the image shake correction device 3 can be reduced.

According to the aforementioned preferred configuration, the elastic force by the flexible print substrates 25 to 27 can be reduced. Thus, the power required for driving the movable member 2 can be reduced, or the drive response of the movable member 2 can be improved.

According to the aforementioned preferable configuration, the flexible print substrates 25 and 26 do not include the power supply line and the ground line. Thus, it is possible to prevent power supply noise from being mixed into the imaging signals output via the flexible print substrates 25 and 26, and it is possible to improve the quality of the captured image.

In a case where the flexible print substrate 27 includes the power supply line and the ground line, the thickness of the flexible print substrate 27 may be greater than the thickness of each of the flexible print substrate 25 and the flexible print substrate 26.

As described above, the width of the flexible print substrate 27 can be prevented from being increased by increasing the thickness of the flexible print substrate 27 including the power supply line and the ground line, and the size of the image shake correction device 3 can be reduced.

Since the width of the flexible print substrate 27 is reduced and the spring multiplier can be reduced, it is possible to more easily design the flexible print substrate 27.

It is preferable that the flexible print substrate 27 includes wirings connected to the X-axis rotation drive coil C1, the X-axis rotation drive coil C2, and the Y-axis drive coil C3 in addition to the power supply line, the ground line, and the wirings connected to the X-axis rotation position detection Hall element H1, the Y-axis rotation position detection Hall element H2, and the Y-axis rotation position detection Hall element H3.

According to this configuration, the flexible print substrate 25 and the flexible print substrate 26 include only wirings of a signal processing system necessary for imaging, and the flexible print substrate 27 includes only wiring necessary for driving the movable member 2.

As described above, the wirings of the signal processing system and the wirings of the driving system are formed on different substrates, and thus, the quality of the captured image can be improved, and the drive performance of the movable member 2 can be improved.

The effects obtained by the preferred configurations of the flexible print substrates 25 to 27 can be similarly obtained even in the image shake correction device 3 that can move the movable member 2 only in the two directions of the direction X and the direction Y. In a case where the movable member 2 moves in three directions, since the movable member 2 becomes heavier, the configurations of the flexible print substrates 25 to 27 are particularly effective.

Next, the details of the two movement restriction units MR1 and MR2 provided in the image shake correction device 3 will be described.

Figure 12:
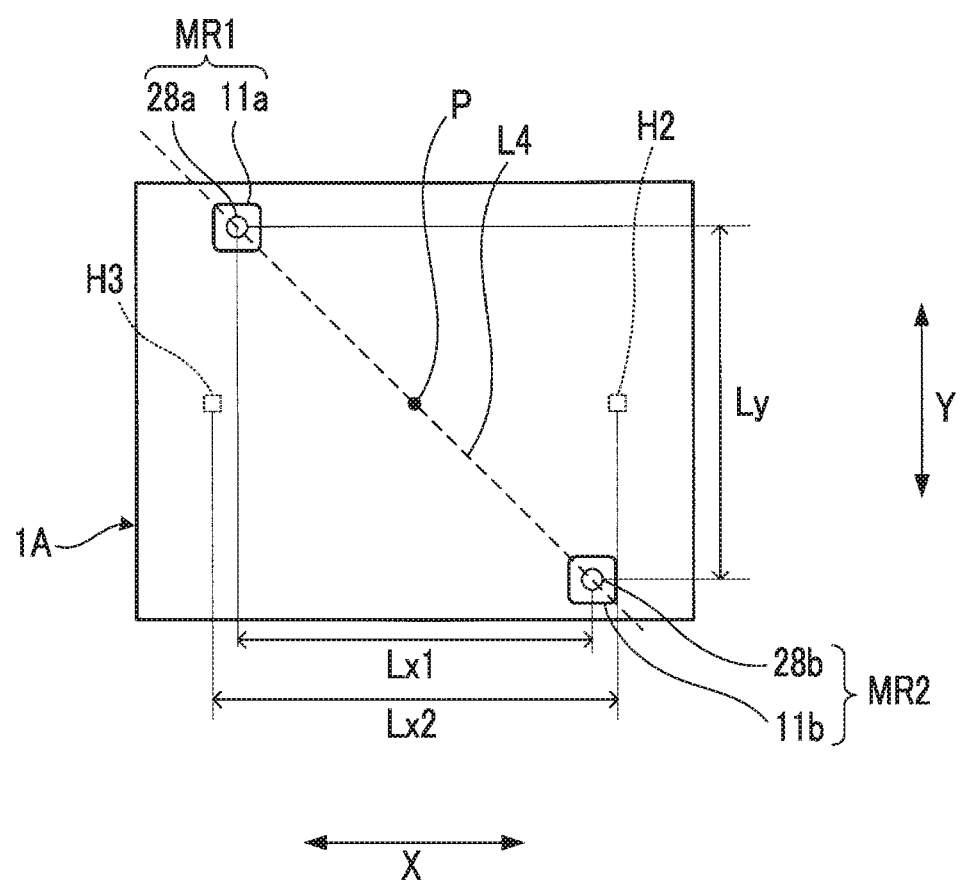
FIG. 12 is a schematic diagram showing a state in which the first support member 1A shown in FIG. 5 is viewed in the direction Z from the side opposite to the imaging optical system 101 side.

FIG. 12 is a schematic diagram showing the first support member 1A shown in FIG. 5 as viewed in the direction Z from the side opposite to the imaging optical system 101 side.

FIG. 12 is an enlarged view of a portion at which the through-holes 11a and 11b of the first support member 1A are formed, and this portion is schematically shown by a rectangle. In FIG. 12, the screws SC1 to SC4 shown in FIG. 5 are not shown.

FIG. 12 shows the Y-axis rotation position detection Hall elements H2 and H3 fixed to the movable member 2 located on the depth side of the paper surface and the insertion members 28a and 28b inserted into the through-holes 11a and 11b formed in the movable member 2.

As shown in FIG. 12, in the reference state, the center of the insertion member 28a is located at the center of the through-hole 11a, and the center of the insertion member 28b is located at the center of the through-hole 11b.

As shown in FIG. 12, the through-hole 11a of the movement restriction unit MR1 and the through-hole 11b of the movement restriction unit MR2 are substantially square.

Figure 13:
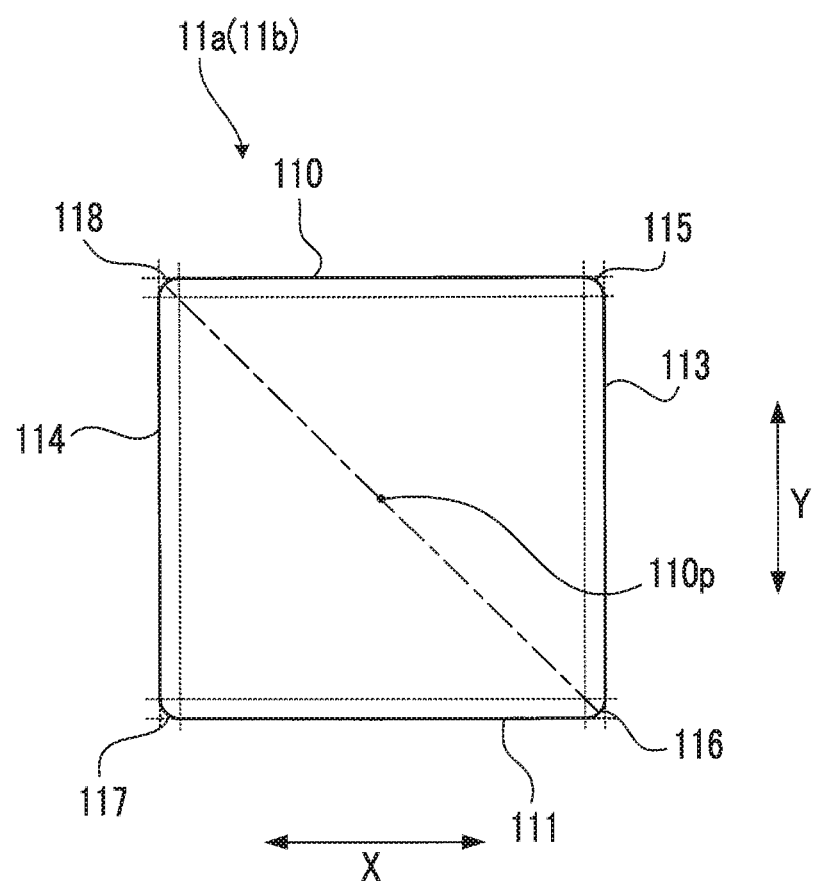
FIG. 13 is an enlarged view of a through-hole 11a shown in FIG. 12.

FIG. 13 is an enlarged view of the through-hole 11a shown in FIG. 12. A shape of the through-hole 11b is the same as that of the through-hole 11a.

As shown in FIG. 13, the through-hole 11a includes four sides 110, 111, 113, and 114 having the same length, a curve 115 that connects the side 110 and the side 113, a curve 116 that connects the side 113 and the side 111, a curve 117 that connects the side 111 and the side 114, and a curve 118 that connects the side 114 and the side 110.

The sides 110 and 111 are parallel to the direction X.

The sides 113 and 114 are parallel to the direction Y. A distance between the side 113 and the side 114 and a distance between the side 110 and the side 111 are the same.

The curves 115 to 118 are arcs of a circle using a center 110p of the through-hole 11a with a center.

Lengths of line segments of the curves 115 to 118 are sufficiently smaller than the lengths of the sides 110 to 114. Specifically, the lengths of the line segments of the curves 115 to 118 are $\frac{1}{10}$ or less of the lengths of the sides 110 to 114.

As stated above, the through-hole 11a (or the through-hole 11b) becomes a substantial square by slightly rounding the four corners of the square, but may be a perfect square.

In FIG. 13, a diagonal line of the square which is the shape of the through-hole 11a (or the through-hole 11b) is indicated by a one-dot chain line. This diagonal line is a portion overlapping the through-hole 11a (or the through-hole 11b) among straight lines connecting an intersection of an extension line of the side 110 and an extension line of the side 114 and an intersection of an extension line of the side 113 and an extension line of the side 111.

As shown in FIG. 12, in a state in which the insertion members 28a and 28b are present at the centers of the through-holes 11a and 11b (the aforementioned reference state), a diagonal line (second diagonal line) of the through-hole 11b overlaps an extension line L4 of the diagonal line (first diagonal line) of the through-hole 11a. The center P of the light receiving surface 20a overlaps a line connecting the diagonal line of the through-hole 11a and the diagonal line of the through-hole 11b.

As shown in FIG. 12, a distance Lx1 in the direction X between the movement restriction unit MR1 and the movement restriction unit MR2 is the same as a distance Ly in the direction Y between the movement restriction unit MR1 and the movement restriction unit MR2.

The distance Lx1 and the distance Ly are equal to or greater than 0.75 times and are equal to or less than 1.25 times of a distance Lx2 in the direction Y between the Y-axis rotation position detection Hall element H2 and the Y-axis rotation position detection Hall element H3.

The distance Lx1 refers to a distance between the centers of the through-hole 11a and the through-hole 11b, or a distance between the centers of the insertion member 28a and the insertion member 28b. The distance Ly refers to the distance between the centers of the through-hole 11a and the through-hole 11b, or the distance between the centers of the insertion member 28a and the insertion member 28b.

As described above, in the image shake correction device 3, the diagonal line of the through-hole 11b overlaps the extension line L4 of the diagonal line of the through-hole 11a, and the center P of the light receiving surface 20a overlaps the extension line L4. Thus, the insertion member 28a moves along a circumference of a circle of which a line connecting the center P and the insertion member 28a is used as a radius. Since this circle passes through the vicinity of the diagonal line of the through-hole 11a, the movement amount of the insertion member 28a can be maximized.

Similarly, since the insertion member 28b moves along a circumference of a circle of which a line connecting the center P and the insertion member 28b is used as a radius, the movement amount can be maximized. As a result, the rotatable amount of the movable member 2 can be maximized, and the image shake correction performance can be improved.

In the image shake correction device 3, each of the distance Lx1 and the distance Ly is equal to or greater than 0.75 times and is equal to or less than 1.25 times the distance Lx2. The distance Lx1 and the distance Ly are each a first distance, and the distance Lx2 is a second distance.

As stated above, the distance Lx1, the distance Ly, and the distance Lx2 are close to each other, and thus, the movement amounts of the insertion members 28a and 28b in a case where the movable member 2 is rotated, and the movement amounts of the Y-axis rotation position detection Hall elements H2 and h3 with respective to the Y-axis rotation position detection magnets Mh2 and Mh3 can be close to each other. Accordingly, it is possible to increase the position detection accuracy of the movable member 2 in the direction θ.

In the movement restriction units MR1 and MR2 shown in FIG. 12, the same effects can be obtained even though the through-holes 11a and 11b are changed to the recess portions formed in the surface of the movable member 2 side of the base 10.

The movement restriction unit MR1 may be configured such that the through-hole 11a or the recess portion is formed in the flat plate portion 280a of the movable member 2 and the insertion member 28a inserted into the through-hole 11a or the recess portion is formed at on the surface of the movable member 2 of the base 10 of the first support member 1A.

Similarly, the movement restriction unit MR2 may be configured such that the through-hole 11b or the recess portion formed in the flat plate portion 280b of the movable member 2 and the insertion member 28b inserted into the through-hole 11b or the recess portion is formed on the surface of the movable member 2 side of the base 10 of the first support member 1A.

In these configurations, the rotation amount of the movable member 2 can be maximized by adopting the planar shape of the through-hole or the recess portion and the arrangement of the two through-holes or recess portions as the configuration shown in FIG. 12.

Figure 14:
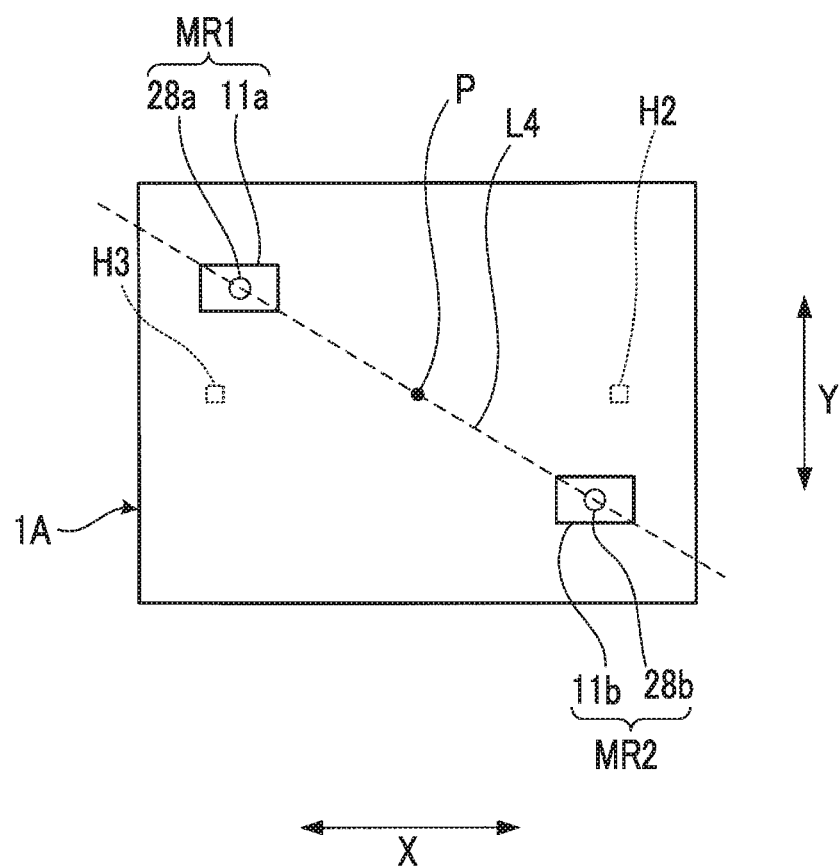
FIG. 14 is a diagram showing a modification example of movement restriction units MR1 and MR2 shown in FIG. 12.

The planar shapes of the through-holes 11a and 11b of the movement restriction units MR1 and MR2 of the image shake correction device 3 are not square, and may be a rectangle as shown in FIG. 14. That is, in a case where the planar shapes of the through-holes 11a and 11b are rectangular, the aforementioned arrangement is effective.

FIG. 14 is a diagram showing a modification example of the movement restriction units MR1 and MR2 shown in FIG. 12. In the example shown in FIG. 14, the planar shapes of the through-holes 11a and 11b of the movement restriction units MR1 and MR2 are rectangles including two sides parallel to the direction X and two sides parallel to the direction Y.

The diagonal line of the through-hole 11b overlaps the extension line L4 of the diagonal line of the through-hole 11a, and the center P of the light receiving surface 20a of the imager 20 overlaps the line connecting the diagonal line of the through-hole 11a and the diagonal line of the through-hole 11b.

Thus, in a case where the shapes of the through-holes 11a and 11b are rectangles, the rotation amount of the movable member 2 can be maximized by adopting the configuration shown in FIG. 14. In FIG. 14, the four corners of the planar shapes of the through-holes 11a and 11b may be rounded.

Next, a modification example of a configuration of each pair of the hooks 16a to 16c formed at the first support member 1A of the image shake correction device 3 and the hooks 23a to 23c of the movable member 2 facing the hooks 16a to 16c will be described.

Figure 15:
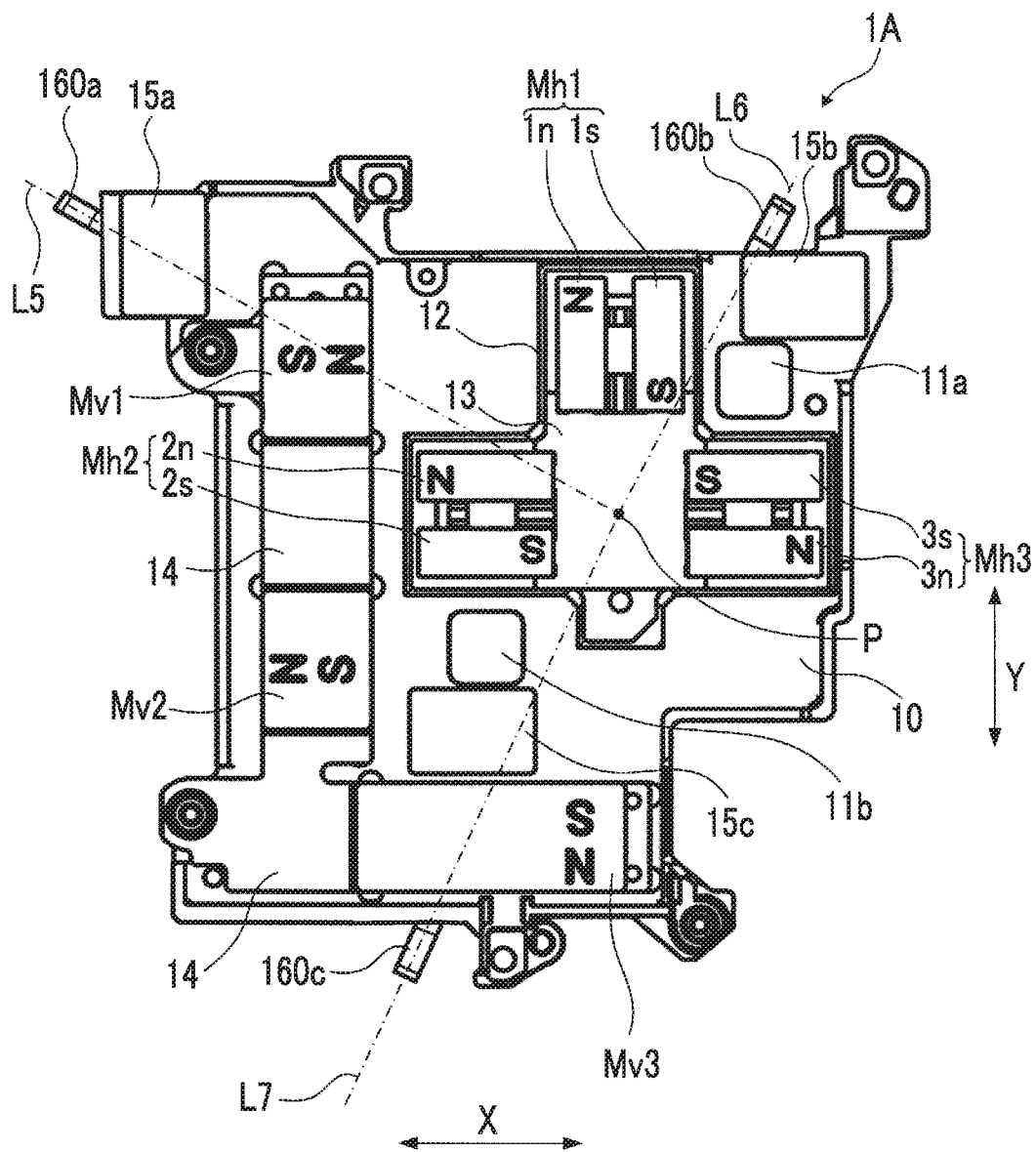
FIG. 15 is a diagram showing a modification example of the first support member 1A shown in FIG. 11.

FIG. 15 is a diagram showing a modification example of the first support member 1A shown in FIG. 11.

The first support member 1A shown in FIG. 15 has the same configuration as that of FIG. 11 except that the hook 16a is changed to a hook 160a, the hook 16b is changed to a hook 160b, and the hook 16c is changed to a hook 160c.

The hook 160a has the same function as the hook 16a, but the extending direction is changed. The hook 160b has the same function as the hook 16b, but the extending direction is changed. The hook 160c has the same function as the hook 16c, but the extending direction is changed.

FIG. 15 shows a first extension line L5 which is an extension line of a line connecting a distal end and a base end (a boundary portion with the base 10) of the hook 160a, a second extension line L6 which is an extension line of a line connecting a distal end and a base end (a boundary portion with the base 10) of the hook 160b, and a third extension line L7 which is an extension line of a line connecting a distal end and a base end (a boundary portion with the base 10) of the hook 160c.

As shown in FIG. 15, the first extension line L5, the second extension line L6, and the third extension line L7 overlap the center P of the light receiving surface 20a of the imager 20.

Figure 16:
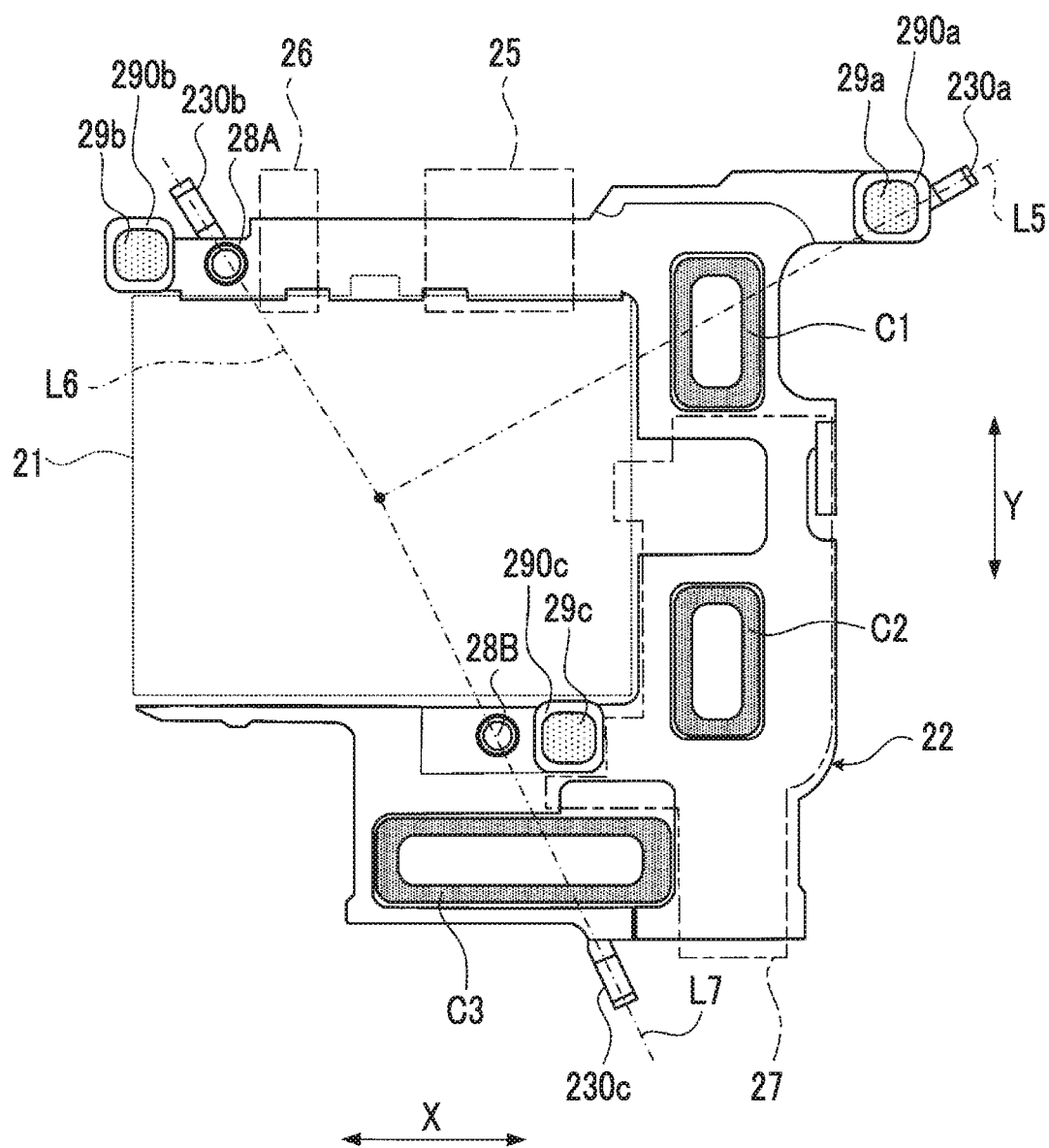
FIG. 16 is a diagram showing a modification example of a base 22 of the movable member 2 shown in FIG. 8.

FIG. 16 is a diagram showing a modification example of the movable member 2 shown in FIG. 8.

The movable member 2 shown in FIG. 16 has the same configuration as that of FIG. 8 except that the hook 23a is changed to a hook 230a, the hook 23b is changed to a hook 230b, and the hook 23c is changed to a hook 230c. FIG. 16 shows the first extension line L5, the second extension line L6, and the third extension line L7 shown in FIG. 15.

The hook 230a has the same function as the hook 23a, but the extending direction is changed. The hook 230b has the same function as the hook 23b, but the extending direction is changed. The hook 230c has the same function as the hook 23c, but the extending direction is changed.

The extending direction of the hook 230a matches the extending direction of the hook 160a shown in FIG. 15. The line connecting the distal end and the base end of the hook 230a and the center P overlaps the first extension line L5.

The extending direction of the hook 230b matches the extending direction of the hook 160b shown in FIG. 15. The line connecting the distal end and the base end of the hook 230b and the center P overlaps the second extension line L6.

The extending direction of the hook 230c matches the extending direction of the hook 160c shown in FIG. 15. The line connecting the distal end and the base end of the hook 230c and the center P overlaps the third extension line L7.

In the modification examples shown in FIGS. 15 and 16, the hook 160a constitutes a first support side locking portion, the hook 160b constitutes a second support side locking portion, and the hook 160c constitutes a third support side locking portion.

In the modification examples shown in FIGS. 15 and 16, the hook 230a constitutes a first movable side locking portion, the hook 230b constitutes a second movable side locking portion, and the hook 230c constitutes a third movable side locking portion.

The spring 24a shown in FIG. 3 that is locked to the hook 160a and the hook 230a constitutes a first elastic member. The spring 24b shown in FIG. 3 that is locked to the hook 160b and the hook 230b constitutes a second elastic member. The spring 24c shown in FIG. 3 that is locked to the hook 160c and the hook 230c constitutes a third elastic member.

According to the image shake correction device 3 including the hooks 160a to 160c and the hooks 230a to 230c of the modification example as shown in FIGS. 15 and 16, in a case where the movable member 2 is rotated around the rotation axis R, the elastic force of the spring 24a locked to the hook 160a and the hook 230a, the elastic force of the spring 24b locked to the hook 160b and the hook 230b, and the elastic force of the spring 24c locked to the hook 160c and the hook 230c are generated only in the rotation direction of the movable member 2.

Accordingly, the drive response in a case where the movable member 2 is rotationally driven can be improved by determining the distances of the springs 24a to 24c from the center P and the multiplier of the springs 24a to 24c such that the elastic forces of the springs 24a to 24c are equal for each spring in a case where the movable member 2 is rotated.

As described above, in a case where the movable member 2 is rotated, since it is not necessary to design the springs 24a to 24c with consideration for the elastic force in the rotation direction, it is possible to easily design the image shake correction device 3.

Figure 17:
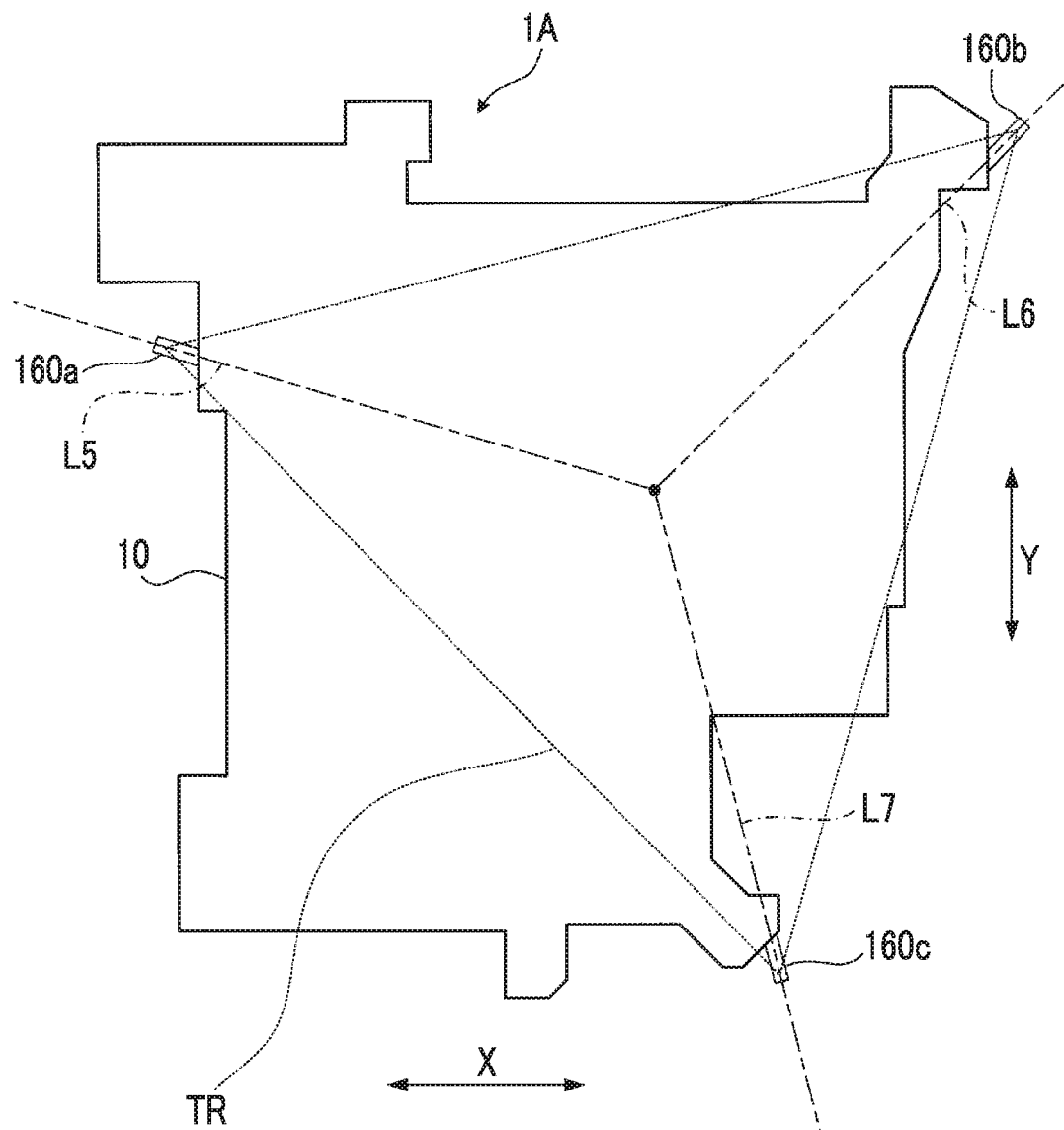
FIG. 17 is a diagram showing a modification example of the arrangement of hooks 160a to 160c shown in FIG. 15 in the base 10.

FIG. 17 is a diagram showing a modification example of the arrangement of the hooks 160a to 160c in the base 10 shown in FIG. 15. In FIG. 17, only the outer edge of the base 10 is shown.

In the example shown in FIG. 17, a case where the center P is present on the extension lines connecting the distal ends and the base ends of the hooks 160a to 160c is the same as that in FIG. 15, but the installation locations of the hooks 160a to 160c are different from those in FIG. 15.

In the example shown in FIG. 17, the hooks 160a to 160c are formed on the base 10 such that the figure connecting the portions of the hooks 160a to 160c to which the springs are locked forms an equilateral triangle TR. The center P of the light receiving surface 20a overlaps the center of the equilateral triangle TR.

The hooks 230a to 230c of the movable member 2 are formed on the base 22 in the same direction as the hooks 160a to 160c at positions of vertices of the equilateral triangle TR.

As described above, the hooks 160a to 160c and the hooks 230a to 230c are arranged so as to overlap the vertices of the equilateral triangle TR, and thus, the distances between the springs 24a to 24c and the center P can be uniformized. As a result, it is possible to more easily design the springs 24a to 24c.

The resultant force of the elastic forces applied to the movable member 2 from the springs 24a to 24c in a case where the movable member 2 moves in the direction X or the direction Y can be made zero, and the drive response of the movable member 2 in the direction X and the direction Y can be improved.

Although it has been described in FIGS. 15 to 17 that there are three pairs of the hooks formed on the first support member 1A and the hooks formed on the movable member 2 facing the hooks, four or more pairs may be used.

Figure 18:
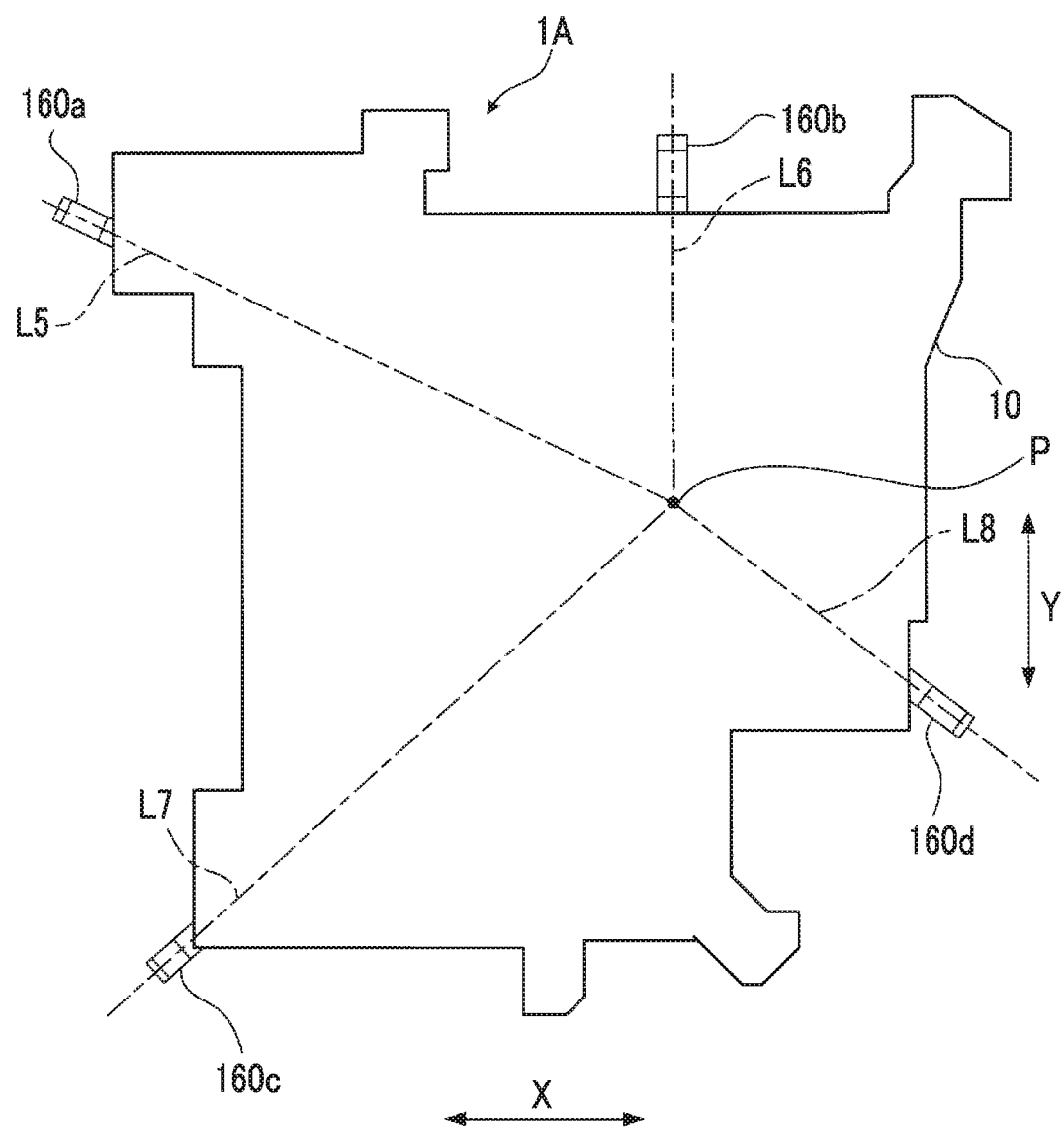
FIG. 18 is a diagram showing another modification example of the first support member 1A shown in FIG. 11.

FIG. 18 is a view showing another modification example of the first support member 1A shown in FIG. 11. In FIG. 18, only the outer edge of the base 10 is shown.

The first support member 1A shown in FIG. 18 has the same configuration of FIG. 11 except that the hook 16a is changed to the hook 160a, the hook 16b is changed to the hook 160b, the hook 16c is changed to the hook 160c, and a hook 160d is further added.

Although not shown, a hook having the same shape as the hook 160a extending in the same direction as the hook 160a is formed at the base 22 of the movable member 2a at a position facing the hook 160a.

A hook having the same shape as the hook 160b extending in the same direction as the hook 160b is formed at the base 22 of the movable member 2 at a position facing the hook 160b.

A hook having the same shape as the hook 160c extending in the same direction as the hook 160c is formed at the base 22 of the movable member 2 at a position facing the hook 160c.

A hook having the same shape as the hook 160d extending in the same direction as the hook 160d is formed at the base 22 of the movable member 2 at a position facing the hook 160d.

Spring are locked to the hooks 160a to 160d and the hooks of the movable member 2 facing the hooks, and the movable member 2 is biased to the first support member 1A by these four springs.

In this modification example, the hook 160d constitutes a fourth support side locking portion. The hook of the movable member 2 facing the hook 160d constitutes a fourth movable side locking portion. The spring locked to the hook 160d and the hook of the movable member 2 facing this hook constitutes a fourth elastic member.

FIG. 18 shows the first extension line L5 which is the extension line of the line connecting the distal end and the base end (the boundary portion with the base 10) of the hook 160a, the second extension line L6 which is the extension line of the line connecting the distal end and the base end (the boundary portion with the base 10) of the hook 160b, the third extension line L7 which is the extension line of the line connecting the distal end and the base end (the boundary portion with the base 10) of the hook 160c, and the fourth extension line L8 which is the extension line of the line connecting the distal end and the base end (the boundary portion with the base 10) of the hook 160d.

As shown in FIG. 18, the first extension line L5, the second extension line L6, the third extension line L7, and the fourth extension line L8 overlap the center P of the light receiving surface 20a of the imager 20.

As stated above, the number of hook pairs is four, and thus, it is possible to urge the movable member 2 against the first support member 1A with more stable force.

The first extension line L5, the second extension line L6, the third extension line L7, and the fourth extension line L8 overlap the center P. With this configuration, when the movable member 2 is rotated, it is not necessary to design the spring with consideration for a spring force in the rotation direction. Thus, it is possible to easily design the image shake correction device 3.

As shown in FIG. 18, in a case where the image shake correction device 3 includes four hook pairs, it is possible to easily design the springs by providing the hooks 160a to 160d at the base 10 such that the figure connecting the portions to which the springs of the four pairs are locked forms a square. The drive response of the movable member 2 in the direction X and the direction Y can be improved.

The first extension line L5, the second extension line L6, the third extension line L7, and the fourth extension line L8 shown in FIGS. 15 to 18 may overlap the center of gravity of the movable member 2.

In the movable member 2, the imager 20 and the circuit board 21 are heavy. Thus, the center of gravity of the movable member 2 and the center P of the light receiving surface 20a are close in many cases.

In a case where there is a restriction on the direction of the hook in the design, it is possible to expect the same effects as in a case where the center P and the extension lines overlap by providing the hooks such that the centers of gravity and the extension lines overlap.

As shown in FIG. 7, the image shake correction device 3 is configured such that the position detectors such as the X-axis position detection Hall element H1, the Y-axis rotation position detection Hall element H2, and the Y-axis rotation position detection Hall element H3 are fixed to the rear surface of the circuit board 21.

A large number of circuit elements constituting a circuit connected to the terminals of the imager 20 and a circuit connected to the terminals of the connectors 21a to 21c are formed on the rear surface of the circuit board 21.

These circuit elements include capacitors, resistors, thermistors, or oscillators. Magnetic materials are included in plating that covers the terminals of these circuit elements or these circuit elements.

Hereinafter, a preferable example of the arrangement of the circuit element including the magnetic materials on the rear surface of the circuit board 21 will be described.

Figure 19:
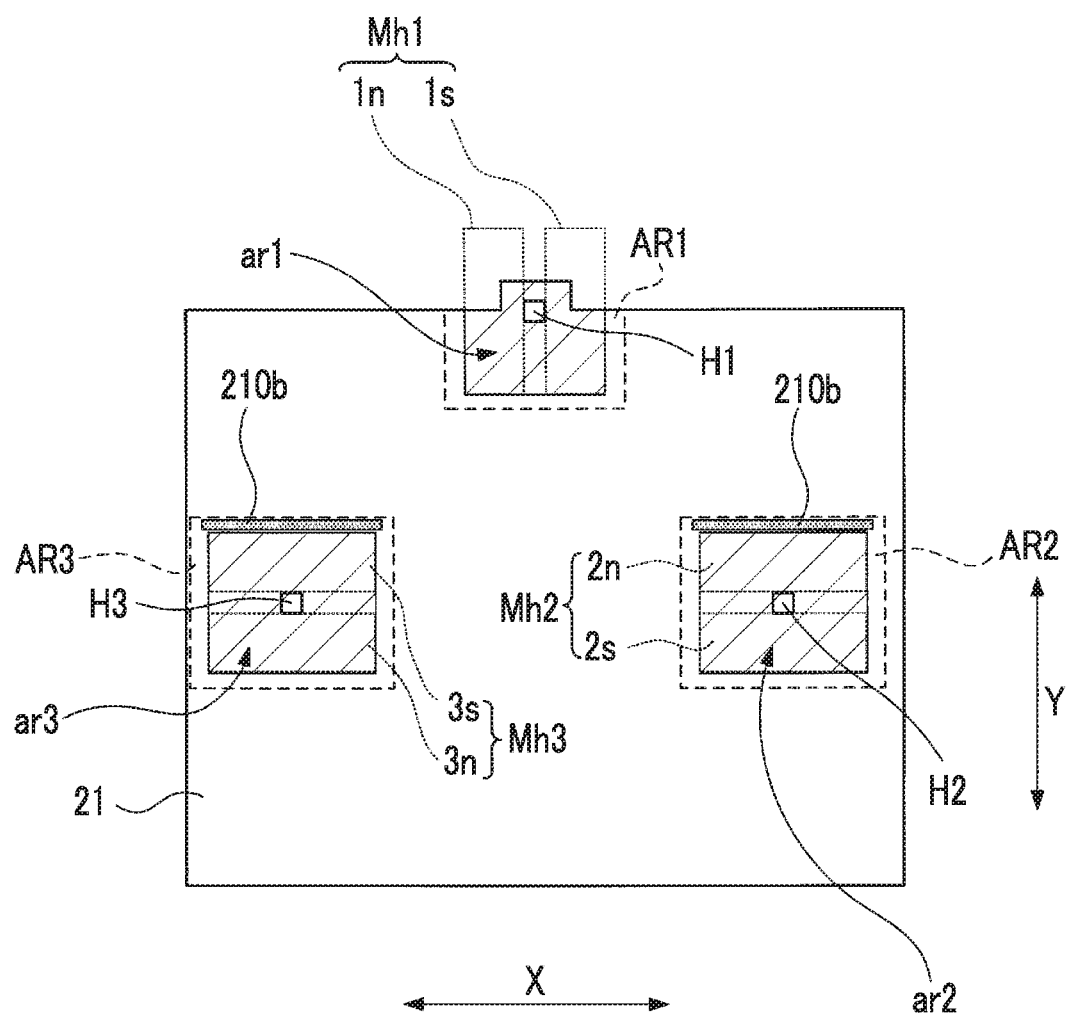
FIG. 19 is a schematic diagram showing a preferable configuration example of the rear surface of the circuit board 21 in the image shake correction device 3.

FIG. 19 is a schematic diagram showing a preferable configuration example of the rear surface of the circuit board 21 in the image shake correction device 3.

FIG. 19 shows a state in which the circuit board 21 of the image shake correction device 3 is viewed in the direction Z from the rear surface side in the reference state. FIG. 19 shows the X-axis position detection magnet Mh1, the Y-axis rotation position detection magnet Mh2, and the Y-axis rotation position detection magnet Mh3 that overlap the circuit board 21.

As shown in FIG. 19, a first region ar1 (a region with diagonal lines) overlapping with the X-axis position detection magnet Mh1, a first region ar2 (a region with diagonal lines) overlapping the Y-axis rotation position detection magnet Mh2, and a first region ar3 (a region with diagonal lines) overlapping the Y-axis rotation position detection magnet Mh3 are present on the rear surface of the circuit board 21.

The first region ar1 is a region overlapping the magnet that supplies the magnetic field to the X-axis position detection Hall element H1, and indicates the N-pole 1n, the S-pole 1s, and a region in which a region between the N-pole 1n and the S-pole is overlaps the circuit board 21.

The first region ar2 is a region overlapping the magnet that supplies the magnetic field to the Y-axis rotation position detection Hall element H2, and indicates the N-pole 2n, the S-pole 2s, and a region in which a region between the N-pole 2n and the S-pole 2s overlaps the circuit board 21.

The first region ar3 is a region overlapping with the magnet that supplies the magnetic field to the Y-axis rotation position detection Hall element H3, and indicates the N-pole 3n, the S-pole 3s, and a region in which a region between the N-pole 3n and the S-pole 3s overlaps the circuit board 21.

On the rear surface of the circuit board 21, a frame-shaped second region AR1 surrounding the first region ar1 is present around the first region ar1, a frame-shaped second region AR2 surrounding the first region ar2 is present around the first region ar2, and a frame-shaped second region AR3 surrounding the first region ar3 is present around the first region ar3.

In the second region AR2 and the second region AR3, a high-density region 210b in which circuit elements are arranged is formed with a density higher than a density of circuit elements arranged in the regions excluding the second regions AR1 to AR3 on the rear surface of the circuit board 21.

The high-density region 210b formed in the second region AR2 is disposed so as to be adjacent to an upper end portion of the first region ar2 in the direction Y.

The high-density region 210b formed in the second region AR3 is disposed so as to be adjacent to an upper end portion of the first region ar3 in the direction Y.

In the configuration example shown in FIG. 19, on the rear surface of the circuit board 21, the high-density region 210b in which many circuit elements are arranged than the other regions is present so as to be adjacent to the directions Y of the first regions ar2 and ar3. Thus, an attractive force can be generated between a large amount of magnetic materials included in the circuit elements formed in the high-density region 210b and the Y-axis rotation position detection magnets Mh2 and Mh3.

In a state in which the digital camera 100 is in the normal posture, the movable member 2 tends to move in the down direction of the direction Y in FIG. 19 due to gravity.

However, the movable member 2 can be moved in the up direction of the direction Y due to this attractive force.

Therefore, the attractive force between the high-density region 210b and the magnet is adjusted by adjusting the amount of magnetic materials in the high-density region 210b or the distance from the high-density region 210b to the first regions ar2 to ar3, and thus, the movement of the movable member 2 due to gravity in the normal posture can be reduced. Accordingly, it is possible to reduce a power required to return the movable member 2 to the reference position.

Figure 20:
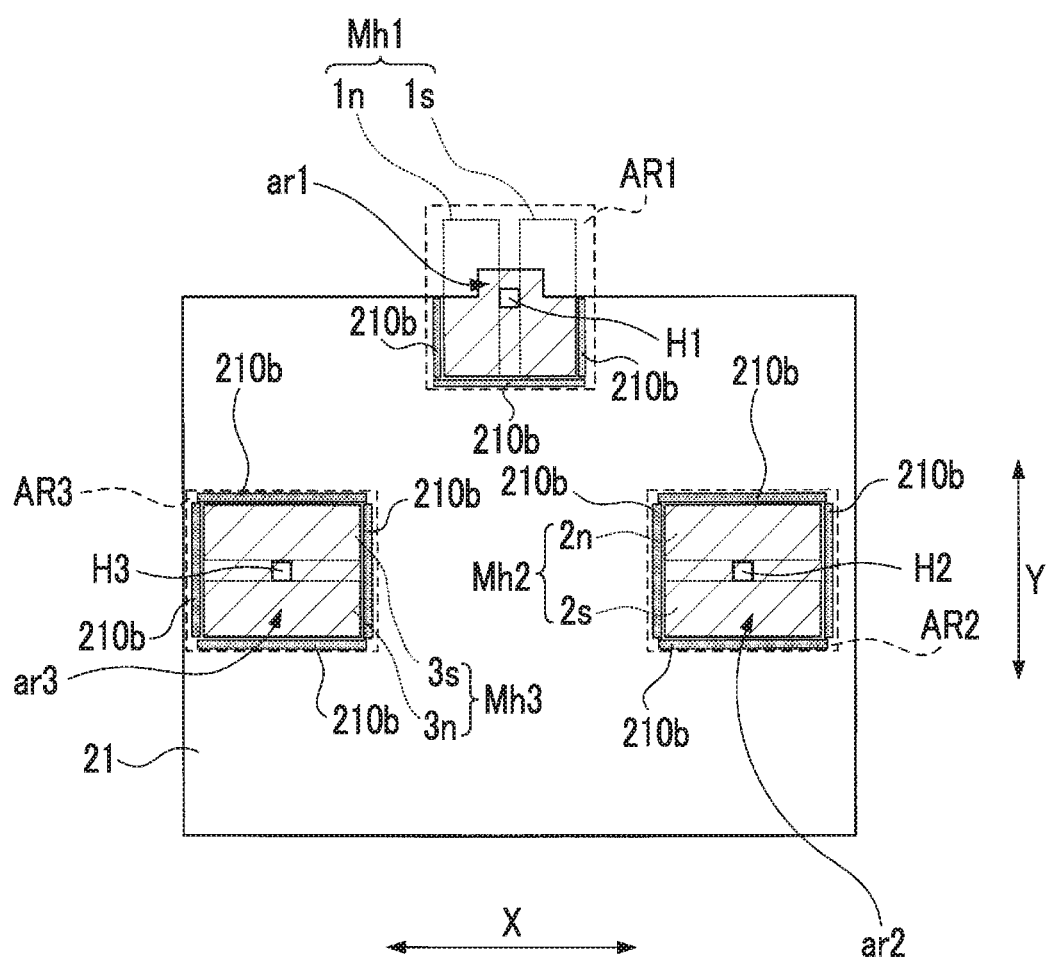
FIG. 20 is a diagram showing a first modification example of the circuit board 21 shown in FIG. 19.

FIG. 20 is a diagram showing a first modification example of the circuit board 21 shown in FIG. 19.

The circuit board 21 shown in FIG. 20 has the same configuration as that shown in FIG. 19 except that three high-density regions 210b are added to the second region AR1 and three high-density regions 210b are added to each of the second region AR2 and the second region AR3.

As shown in FIG. 20, in the second region AR1, the high-density region 210b is disposed so as to be adjacent to the end portion of the first region ar1 on the down direction side of the direction Y, and the high-density region 210b is disposed so as to be adjacent to both end portions of the first region ar1 in the direction X.

In the second region AR2, the high-density region 210b is disposed so as to be adjacent to both end portions of the first region ar2 in the direction Y, and the high-density region 210b is disposed so as to be adjacent to both end portions of the first region ar2 in the direction X.

In the second region AR3, the high-density region 210b is disposed so as to be adjacent to both end portions of the first region ar3 in the direction Y, and the high-density region 210b is disposed so as to be adjacent to both end portions of the first region ar3 in the direction X.

According to the modification example shown in FIG. 20, the attractive force between the high-density region 210b on a lower side of each of the first regions ar1 to ar3 and the magnet and the attractive force between the high-density region 210b on an upper side of each of the first regions ar2 to ar3 and the magnet are adjusted, and thus, the movable member 2 can be held at the reference position without driving the movable member 2 in a case where the digital camera 100 is in the normal posture.

According to the modification example shown in FIG. 20, the attractive force between the high-density region 210b on a left side of each of the first regions ar1 to ar3 and the magnet and the attractive force between the high-density region 210b on a right side of each of the first regions ar1 to ar3 and the magnet are adjusted, and thus, the movable member 2 can be held at the reference position without driving the movable member 2 even though the digital camera 100 is in a rotation posture (a posture in which the direction X is parallel to the gravity) which is rotated by 90 degrees from the normal posture.

Thus, the power required for driving the movable member 2 can be reduced in both the normal posture and the rotational posture.

The second region AR1 shown in FIGS. 19 and 20 is a range in which the magnetic force of the X-axis position detection magnet Mh1 sufficiently reaches, and is, for example, a range to a position separated from the end portion of the first region ar1 in the direction X and the direction Y by about 1 mm to 5 mm.

Similarly, the second region AR2 is a range in which the magnetic force of the Y-axis rotation position detection magnet Mh2 sufficiently reaches, and is, for example, a range separated from the end portion of the first region ar2 in the direction X and the direction Y by about 1 mm to 5 mm.

Similarly, the second region AR3 is a range in which the magnetic force of the Y-axis rotation position detection magnet Mh3 sufficiently reaches, and is, for example, a range separated from the end portion of the first region ar3 in the direction X and the direction Y by about 1 mm to 5 mm.

In the modification example shown in FIGS. 19 and 20, the attractive force between the magnetic materials and the magnet in the high-density region 210b also functions as an urging force that urges the movable member 2 against the first support member 1A.

Thus, the spring 24a, the spring 24b, and the spring 24c shown in FIG. 3 may be removed by adjusting the attractive force. Accordingly, it is possible to reduce the size and cost of the image shake correction device 3.

Figure 21:
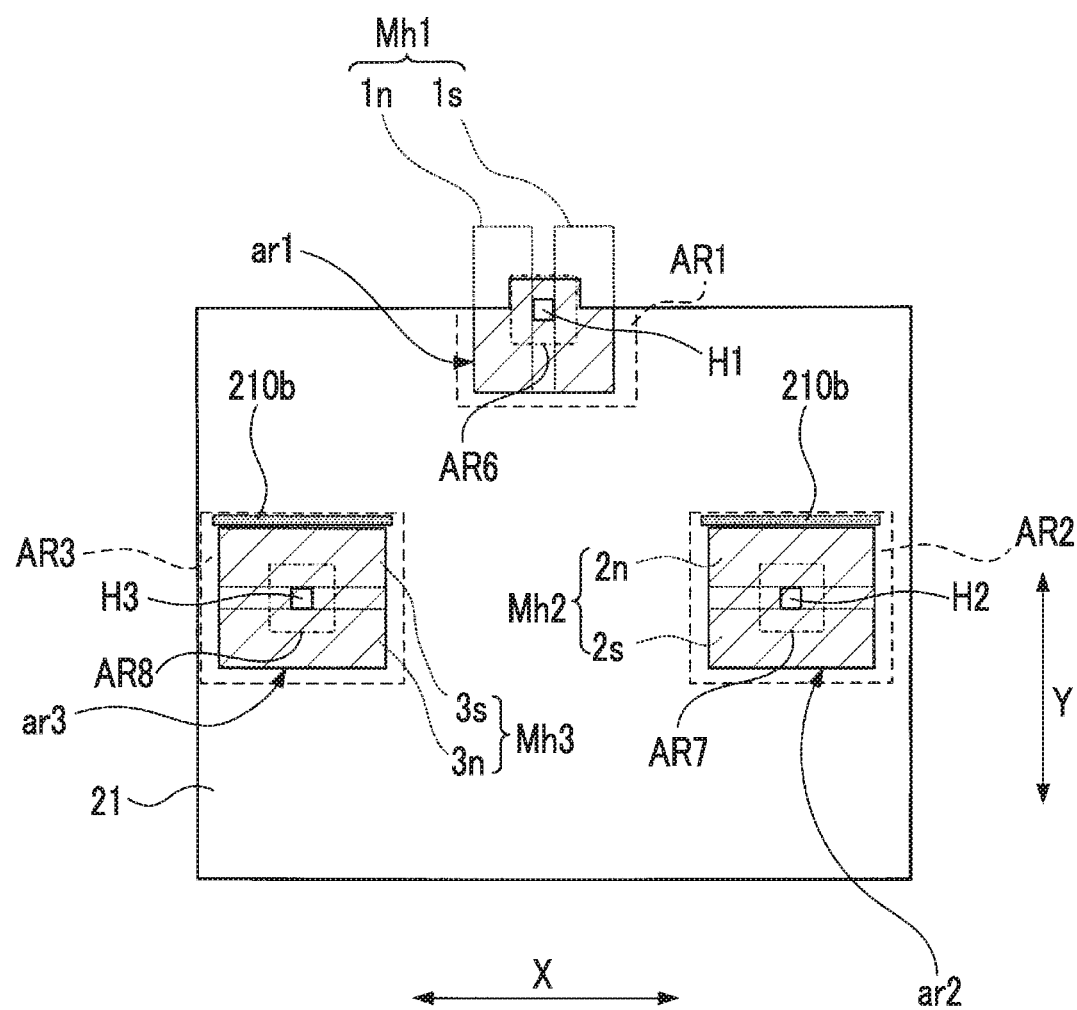
FIG. 21 is a diagram showing a second modification example of the circuit board 21 shown in FIG. 19.

FIG. 21 is a diagram showing a second modification example of the circuit board 21 shown in FIG. 19.

The circuit board 21 shown in FIG. 21 has the same configuration as the circuit board 21 shown in FIG. 19 except that non-arrangement regions AR6, AR7, and AR8 which are regions in which circuit elements are not arranged are formed around each of the first regions ar1 to ar3, the X-axis position detection Hall element H1, the Y-axis rotation position detection Hall element H2, and the Y-axis rotation position detection Hall element H3.

The non-arrangement region AR6 is a square using the X-axis position detection Hall element H1 as a center, and is a region where a square having two sides parallel to the direction X and two sides parallel to the direction Y and the first region ar1 overlap.

A length from the center of the X-axis position detection Hall element H1 to an end portion of the non-arrangement region AR6 in the direction X is a value which is equal to or greater than 1.5 times of the maximum movement distance with which the movable member 2 can be moved in one direction of the direction X.

A length from the center of the X-axis position detection Hall element H1 to an end portion of the non-arrangement region AR6 in the direction Y is a value which is equal to or greater than 1.5 times of the maximum movement distance with which the movable member 2 can be moved in one direction of the direction Y.

The length from the center of the X-axis position detection Hall element H1 to the end portion of the non-arrangement region AR6 in the direction X and the length from the center of the X-axis position detection Hall element H1 to the end portion of the non-arrangement region AR6 in the direction Y may be values which are equal to or greater than the distance between the X-axis position detection Hall element H1 and the X-axis position detection magnet Mh1.

The non-arrangement region AR7 is a square using the Y-axis rotation position detection Hall element H2 as a center, and is a region in which a square having two sides parallel to the direction X and two sides parallel to the direction Y and the first region ar2 overlap.

A length from the center of the Y-axis rotation position detection Hall element H2 to an end portion of the non-arrangement region AR7 in the direction X is a value which is equal to or greater than 1.5 times of the maximum movement distance with which the movable member 2 can be moved in one direction of the direction X.

A length from the center of the Y-axis rotation position detection Hall element H2 to an end portion of the non-arrangement region AR7 in the direction Y is a value which is equal to or greater than 1.5 times of the maximum movement distance with which the movable member 2 can be moved in one direction of the direction Y.

The length from the center of the Y-axis rotation position detection Hall element H2 to the end portion of the non-arrangement region AR7 in the direction X and the length from the center of the Y-axis rotation position detection Hall element H2 and the end portion of the non-arrangement region AR7 in the direction Y may be values which are equal to or greater than the distance between the Y-axis rotation position detection Hall element H2 and the Y-axis rotation position detection magnet Mh2.

The non-arrangement region AR8 is a square using the Y-axis rotation position detection Hall element H3 as a center, and is a region in which a square having two sides parallel to the direction X and two sides parallel to the direction Y and the first region ar3 overlap.

A length from the center of the Y-axis rotation position detection Hall element H3 to an end portion of the non-arrangement region AR8 in the direction X is a value which is equal to or greater than 1.5 times of the maximum movement distance with which the movable member 2 can be moved in one direction of the direction X.

A length from the center of the Y-axis rotation position detection Hall element H3 to an end portion of the non-arrangement region AR8 in the direction Y is a value which is equal to or greater than 1.5 times of the maximum movement distance with which the movable member 2 can be moved in one direction of the direction Y.

The length from the center of the Y-axis rotation position detection Hall element H3 to the end portion the non-arrangement region AR8 in the direction X of and the length from the center of the Y-axis rotation position detection Hall element H3 and the end portion of the non-arrangement region AR8 in the direction Y may be values which are equal to or greater than the distance between the Y-axis rotation position detection Hall element H3 and the Y-axis rotation position detection magnet Mh3.

According to the modification example shown in FIG. 21, since a region in which the circuit element including the magnetic materials is not disposed is formed around each of the X-axis position detection Hall element H1, the Y-axis rotation position detection Hall element H2, and the Y-axis rotation position detection Hall element H3, it is possible to stabilize the linearity of the output of each Hall element, and it is possible to perform highly accurate position detection.

The modification example shown in FIG. 21 is also applicable to the circuit board 21 shown in FIG. 20.

In the circuit board 21 shown in FIG. 21, the circuit elements may be arranged with a density lower than a density of the high-density region 210b at a portion of the first region ar1 excluding the non-arrangement region AR6, a portion of the first region ar2 excluding the non-arrangement region AR7, and a portion of the first region ar3 excluding the non-arrangement region AR8. However, the circuit elements are not arranged at these portions, and thus, it is possible to further improve the position detection accuracy.

The same effects obtained by the configuration of the circuit board 21 shown in FIGS. 19 to 21 are obtained even in the image shake correction device 3 in which the movable member 2 can be moved only in the two directions of the direction X and the direction Y. In a case where the movable member 2 is moved in three directions, the movable member 2 becomes heavier. Thus, the configuration of the circuit board 21 shown in FIGS. 19 to 21 is particularly effective.

As long as the position can be detected by a change of the magnetic field supplied from the magnet, a magnetic sensor other than the Hall element may be used as the position detector for detecting the position of the movable member 2 in the image shake correction device 3.

Next, a configuration of a smartphone will be described as another embodiment of the imaging device of the present invention.

Figure 22:
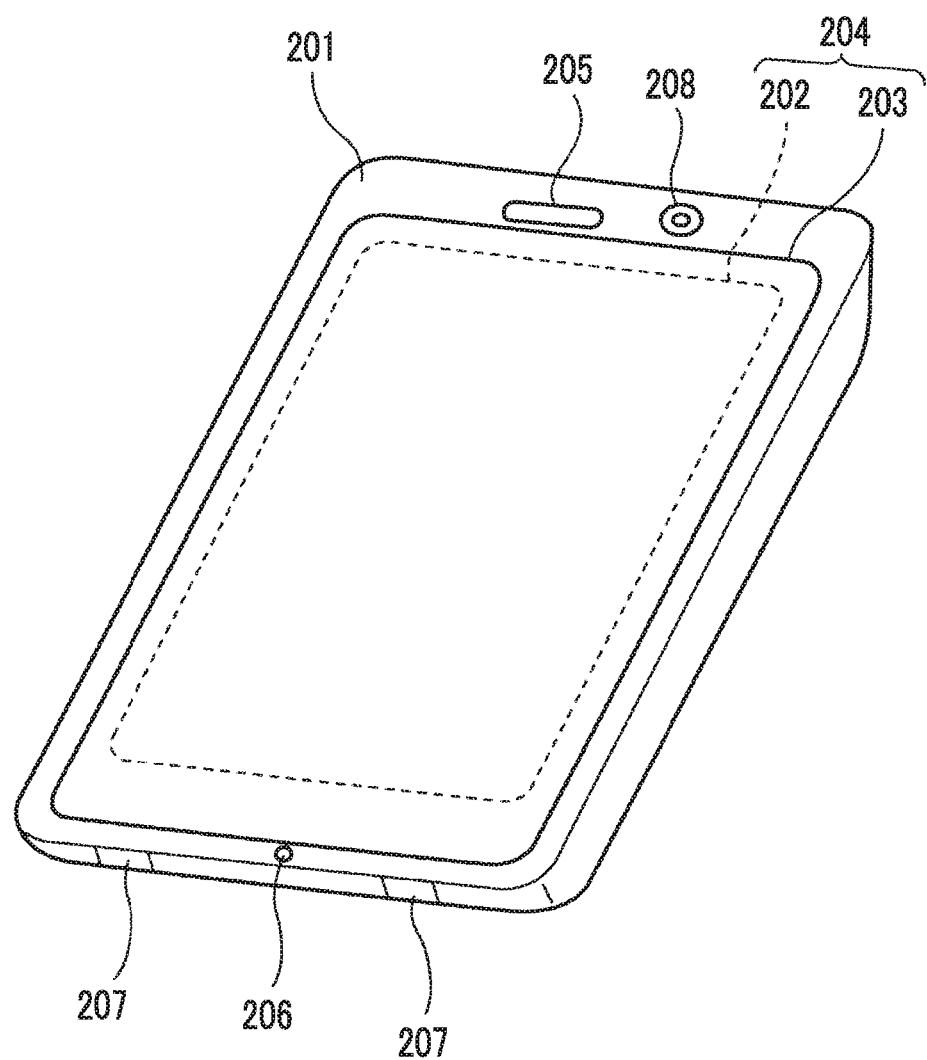
FIG. 22 shows an appearance of a smartphone 200 that is an embodiment of an imaging device of the present invention.

FIG. 22 shows an appearance of a smartphone 200 that is an embodiment of the imaging device of the present invention.

A smartphone 200 shown in FIG. 22 includes a flat plate casing 201, and comprises a display input unit 204 in which a display panel 202 as a display surface and an operation panel 203 as an input unit are integrated on one surface of the casing 201.

Such a casing 201 comprises a speaker 205, a microphone 206, an operation unit 207, and a camera unit 208. The configuration of the casing 201 is not limited thereto, and for example, a configuration in which the display surface and the input unit are independent can be employed, or a configuration having a folding structure or a slide mechanism can be employed.

Figure 23:
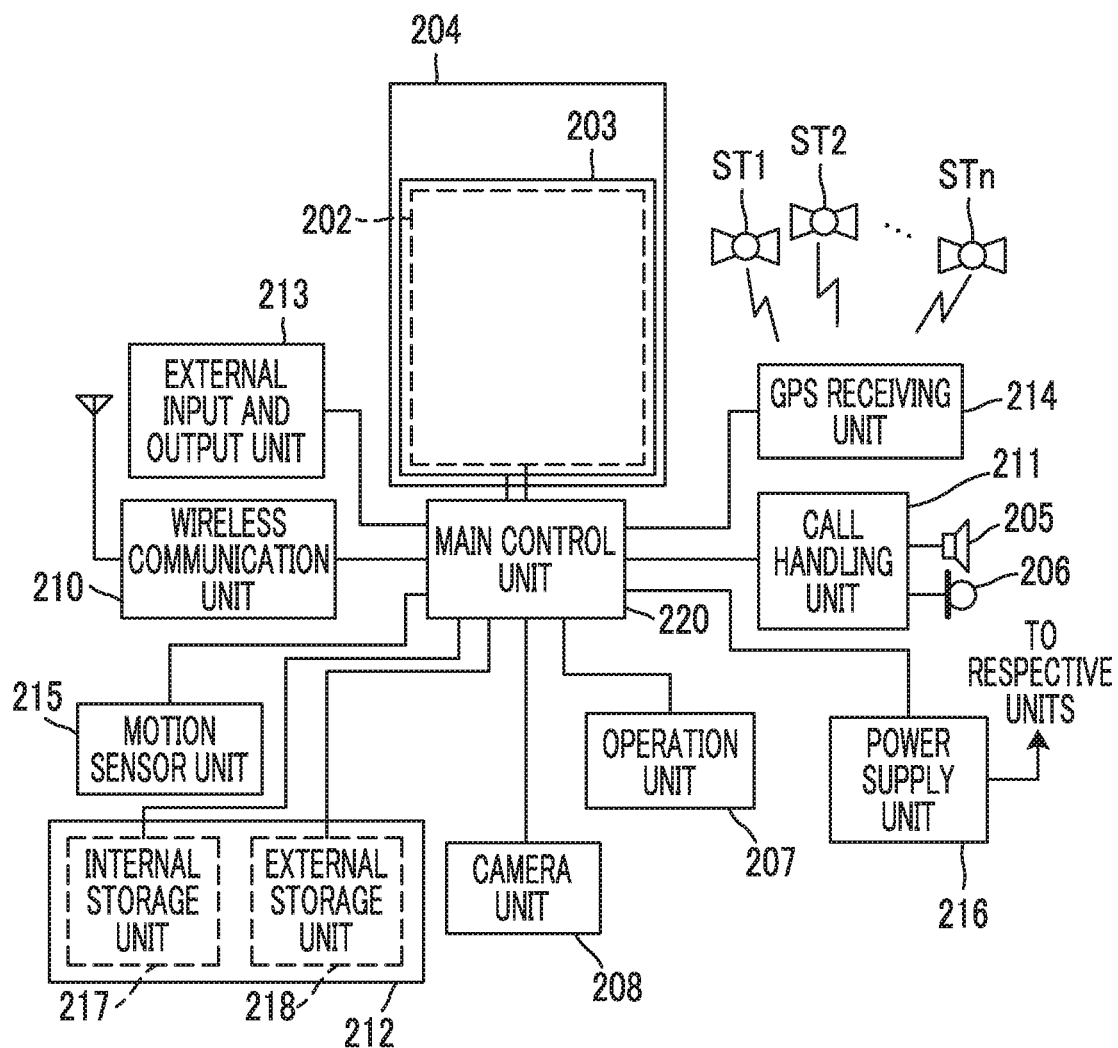
FIG. 23 is a block diagram showing a configuration of the smartphone 200 shown in FIG. 22.

FIG. 23 is a block diagram showing a configuration of the smartphone 200 shown in FIG. 22.

As shown in FIG. 23, the smartphone includes, as main components, a wireless communication unit 210, the display input unit 204, a call handling unit 211, the operation unit 207, the camera unit 208, a storage unit 212, an external input and output unit 213, a Global Positioning System (GPS) reception unit 214, a motion sensor unit 215, a power supply unit 216, and a main controller 220.

The smartphone 200 has, as a main function, a wireless communication function of performing mobile wireless communication through a base station apparatus BS (not shown) and a mobile communication network NW (not shown).

The wireless communication unit 210 performs wireless communication with the base station apparatus BS belonging to the mobile communication network NW according to an instruction of the main controller 220. The transmission and reception of various file data such as voice data, image data, and e-mail data, and reception of Web data or streaming data are performed by using this wireless communication.

Under the control of the main controller 220, the display input unit 204 displays images (still images and moving images) or text information, and visually transmits the images and information to the user, and is a so-called touch panel that detects a user operation for the displayed information. The display input unit comprises the display panel 202 and the operation panel 203.

The display panel 202 uses, as a display device, a liquid crystal display (LCD) or an organic electro-luminescence display (OELD).

The operation panel 203 is a device that is mounted so as to visually recognize the image displayed on the display surface of the display panel 202, and detects one or a plurality of coordinates operated by a finger of the user or a stylus. In a case where this device is operated by the finger of the user or the stylus, a detection signal generated due to the operation is output to the main controller 220. Subsequently, the main controller 220 detects an operation position (coordinates) on the display panel 202 based on the received detection signal.

As shown in FIG. 23, although it has been described that the display panel 202 and the operation panel 203 of the smartphone 200 illustrated as the embodiment of the imaging device of the present invention are integrally formed and constitute the display input unit 204, the operation panel 203 is disposed so as to completely cover the display panel 202.

In a case where such an arrangement is adopted, the operation panel 203 may have a function of detecting the user operation even in a region outside the display panel 202. In other words, the operation panel 203 may have a detection region (hereinafter, referred to as a display region) for an overlapped portion which overlaps with the display panel 202 and a detection region (hereinafter, referred to as a non-display region) for an outer edge portion which does not overlap with the display panel 202.

The size of the display region and the size of the display panel 202 may completely match each other, and it is not necessary to match both the sizes. The operation panel 203 may have the outer edge portion and two sensitive regions which are inner portions other than the outer edge. A width of the outer edge portion is appropriately designed according to the size of the casing 201.

Examples of the position detection method employed in the operation panel 203 include a matrix switch method, a resistive film method, a surface acoustic wave method, an infrared method, an electromagnetic induction method, and an electrostatic capacitance method.

The call handling unit 211 comprises the speaker 205 or the microphone 206, converts the voice of the user input through the microphone 206 into voice data capable of being processed by the main controller 220 to output the voice data to the main controller 220 or decodes the voice data received by the wireless communication unit 210 or the external input and output unit 213 to output the decoded voice data from the speaker 205.

For example, as shown in FIG. 22, the speaker 205 may be mounted on the same surface as the surface on which the display input unit 204 is provided, and the microphone 206 may be mounted on a side surface of the casing 201.

The operation unit 207 is a hardware key using a key switch, and receives an instruction from the user. For example, as shown in FIG. 22, the operation unit 207 is a push button type switch which is mounted on a side surface of the casing 201 of the smartphone 200, and is turned on by being pressed with the finger and is turned off by a restoring force such as a spring in a case where the finger is released.

The storage unit 212 stores a control program and control data of the main controller 220, application software, address data associated with a name or a telephone number of a communication partner, the transmitted and received e-mail data, Web data downloaded by Web browsing, and download content data, and temporarily stores streaming data. The storage unit 212 includes an internal storage unit 217 built in the smartphone, and an external storage unit 218 having a slot for a detachable external memory slot.

The internal storage unit 217 and the external storage unit 218 constituting the storage unit 212 is realized by using a storage medium such as a memory (for example, MicroSD (registered trademark) memory) of a flash memory type, a hard disk type, a multimedia card micro type, or a card type, a random access memory (RAM), or a read only memory (ROM).

The external input and output unit 213 serves as an interface with all external devices coupled to the smartphone 200, and directly or indirectly communicates with other external devices by (for example, universal serial bus (USB) or IEEE 1394) or a network (for example, Internet, wireless LAN, Bluetooth (registered trademark), radio frequency identification (RFID), Infrared Data Association (IrDA) (registered trademark), ultra wideband (UWB) (registered trademark), or ZigBee (registered trademark).

Examples of the external device to be connected to the smartphone 200 includes a wired or wireless headset, an external wired or wireless charger, a wired or wireless data port, a memory card to be connected through a card socket, subscriber identity module (SIM)/user identity module (UIM) card, or an external audio and video device to be connected through an audio and video input and output (I/O) terminal, an external audio and video device to be connected in a wireless manner, a smartphone to be connected in a wired or wireless manner, a personal computer to be connected in a wired or wireless manner, or an earphone to be connected in a wired or wireless manner.

The external input and output unit 213 can transfer data transmitted from the external devices to the components in the smartphone 200 or can transmit data in the smartphone 200 to the external devices.

The GPS receiving unit 214 receives GPS signals transmitted from GPS satellites ST1 to STn according to an instruction of the main controller 220, performs positioning calculation processing based on a plurality of received GPS signals, and detects the position of the smartphone 200 having latitude, longitude, and altitude. In a case where positional information can be acquired from the wireless communication unit 210 or the external input and output unit 213 (for example, a wireless LAN), the GPS receiving unit 214 can detect the position by using the positional information.

For example, the motion sensor unit 215 comprises a three-axis acceleration sensor, and detects physical motion of the smartphone 200 according to an instruction of the main controller 220. The movement direction or acceleration of the smartphone 200 is detected by detecting the physical motion of the smartphone 200. The detection result is output to the main controller 220.

The power supply unit 216 supplies power stored in a battery (not shown) to the respective units of the smartphone 200 according to an instruction of the main controller 220.

The main controller 220 comprises a microprocessor, operates according to the control program or control data stored in the storage unit 212, and integrally controls the units of the smartphone 200. The main controller 220 has a mobile communication control function of controlling the units of a communication system in order to perform voice communication or data communication through the wireless communication unit 210, and an application processing function.

The application processing function is realized by the main controller 220 operating according to application software stored in the storage unit 212. The application processing function is, for example, an infrared communication function of controlling the external input and output unit 213 to perform data communication with a device facing the smartphone, an electronic mail function of transmitting and receiving electronic mails, or a Web browsing function of browsing Web pages.

The main controller 220 has an image processing function of displaying video on the display input unit 204 based on image data (still image or moving image data), such as received data or downloaded streaming data.

The image processing function refers to a function of the main controller 220 decoding the image data, performing image processing on the decoding result, and displaying an image on the display input unit 204.

The main controller 220 performs display control on the display panel 202 and operation detection control for detecting a user operation through the operation unit 207 and the operation panel 203.

Through the performing of the display control, the main controller 220 displays an icon for activating application software or a software key, such as a scroll bar, or displays a window for creating electronic mails.

The scroll bar refers to a software key for receiving an instruction to move a display portion of an image which is too large to fit into the display region of the display panel 202.

Through the performing of the operation detection control, the main controller 220 detects the user operation through the operation unit 207, receives an operation on the icon or an input of a character string in an input field of the window through the operation panel 203, or receives a scroll request of a display image through the scroll bar.

Through the performing of the operation detection control, the main controller 220 has a touch panel control function of determining whether or not an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main controller 220 may detect a gesture operation on the operation panel 203 and may execute a function set in advance according to the detected gesture operation.

The gesture operation is not a conventional simple touch operation, but means an operation to render a track with a finger, an operation to simultaneously designate a plurality of positions, or an operation to render a track for at least one of a plurality of positions by combining the aforementioned operations.

The camera unit 208 includes components other than the motion detection sensor 106, the system controller 108, and the image processing unit 107 of the digital camera 100 shown in FIG. 1. In the smartphone 200, the main controller 220 controls the image shake correction device 3 based on information from the motion sensor unit 215 corresponding to the motion detection sensor 106 to perform image shake correction.

Captured image data generated by the camera unit 208 can be recorded in the storage unit 212 or can be output through the external input and output unit 213 or the wireless communication unit 210.

Although it has been described in the smartphone 200 shown in FIG. 22 that the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS receiving unit 214 detects the position, the position may be detected by referring to an image from the camera unit 208. The optical axis direction of the camera unit 208 of the smartphone 200 can be determined or a current usage environment may be determined by referring to an image from the camera unit 208 without using the three-axis acceleration sensor or in combination with the three-axis acceleration sensor. An image from the camera unit 208 may be used in application software.

Image data of a still image or a moving image may be attached with positional information acquired by the GPS receiving unit 214, voice information (which may be converted to text information through voice-text conversion by the main controller) acquired by the microphone 206, or posture information acquired by the motion sensor unit 215 and can be recorded in the storage unit 212, or may be output through the external input and output unit 213 or the wireless communication unit 210.

In the smartphone 200 having the aforementioned configuration, the image shake correction device 3 has the aforementioned configuration, and thus, it is possible to obtain various effects.

As described above, the following items are disclosed in this specification.

(1) There is provided a movable support device comprising a movable unit that includes an imager, a first flexible substrate including wirings connected to terminals other than a power supply terminal and a ground terminal among terminals of the imager, and a second flexible substrate including wirings connected to the power supply terminal and the ground terminal, and a support member that supports the movable unit to be movable in a longitudinal direction of a light receiving surface of the imager and a short direction of the light receiving surface. The first flexible substrate includes a first portion extending in one direction of the short direction and a folded portion folded at an end portion of the first portion in the other direction of the short direction, and the second flexible substrate includes a second portion extending in the other direction of the short direction and a folded portion folded at an end portion of the second portion in the one direction of the short direction.

(2) In the movable support device according to (1), a thickness of the second flexible substrate is greater than a thickness of the first flexible substrate.

(3) In the movable support device according to (1) or (2), the movable unit includes position detectors that detect a position of the movable unit in a movement direction and drive coils that move the movable unit, and the second flexible substrate further includes wirings connected to the position detectors and wirings connected to the drive coils.

(4) There is provided an image shake correction device comprising the movable support device according to any one of (1) to (3).

(5) There is provided an imaging device comprising the image shake correction device according to (4).

The present invention is highly convenient and effective by being applied to a digital camera such as a single-lens reflex camera or a mirrorless camera, an in-vehicle camera, a surveillance camera, or a smartphone.

Although the present invention has been described in conjunction with the specific embodiments, the present invention is not limited to these embodiments, and can be variously changed without departing from the technical idea of the disclosed invention.

This application is based on Japanese Patent Application (JP2017-186877) filed Sep. 27, 2017, the content of which is incorporated herein.

EXPLANATION OF REFERENCES

100: digital camera
101: imaging optical system
20: imager

3: image shake correction device
104: AFE
105: imager drive unit
106: motion detection sensor
108: system controller
107: image processing unit
K: optical axis
1: support member
1A: first support member
Mh1: X-axis position detection magnet
Mh2: Y-axis rotation position detection magnet
Mh3: Y-axis rotation position detection magnet
1s, 2s, 3s: S-pole
1n, 2n, 3n: N-pole
Mv1: X-axis rotation drive magnet
Mv2: X-axis rotation drive magnet
Mv3: Y-axis drive magnet
1B: second support member
mv1: X-axis rotation drive magnet
mv2: X-axis rotation drive magnet
mv3: Y-axis drive magnet
2: movable member
C1: X-axis rotation drive coil
C2: X-axis rotation drive coil
C3: Y-axis drive coil
21: circuit board
H1: X-axis position detection Hall element
H2: Y-axis rotation position detection Hall element
H3: Y-axis rotation position detection Hall element
20a: light receiving surface
P: center of light receiving surface
R: rotation axis
10: base
11a, 11b: through-hole
12, 14: yoke
13: coupling member
15a, 15b, 15c: flat surface
16a, 16b, 16c: hook
17a, 17b, 17c: projecting portion
18: yoke
19a: hole portion
19b, 19c: notch portion
SC1, SC2, SC3, SC4: screw
21a, 21b, 21c: connector
22: base
23a, 23b, 23c: hook
24a, 24b, 24c: spring
25, 26, 27: flexible print substrate
25a, 26a: first portion
270: second portion
25b, 26b, 271: folded portion
27a: fixed portion
27b: non-fixed portion
28A, 28A: attachment portion
28a, 28b: insertion member
280a, 280b: flat plate portion
29a, 29b, 29c: bottom surface
290a, 290b, 290c: recess portion
MR1, MR2 Movement Restriction Department
L1, L2, L3: straight line
L4: extension line
110, 111, 113, 114: side
115, 116, 117, 118: curve
110p: center of through-hole
L5: first extension line
L6: second extension line
L7: third extension line
L8: fourth extension line
160a, 160b, 160c, 160d: hook
230a, 230b, 230c: hook
TR: equilateral triangle
ar1, ar2, ar3: first region
AR1, AR2, AR3: second region
21b: high-density region
AR6, AR7, AR8: non-arrangement region
200: smartphone
201: casing
202: display panel
203: operation panel
204: display input unit
205: speaker
206: microphone
207: operation unit
208: camera unit
210: wireless communication unit
211: call handling unit
212: storage unit
213: external input and output unit
214: GPS receiving unit
215: motion sensor unit
216: power supply unit
217: internal storage unit
218: external storage unit
220: main controller
ST1 to STn: GPS satellites

What is claimed is:

1. A movable support device comprising:
   a movable unit that includes an imager, a first flexible substrate including wirings connected to terminals other than a power supply terminal and a ground terminal among terminals of the imager, and a second flexible substrate including wirings connected to the power supply terminal and the ground terminal; and
   a support member that supports the movable unit to be movable in a longitudinal direction of a light receiving surface of the imager and a short direction of the light receiving surface,
   wherein the first flexible substrate includes a first portion extending in one direction of the short direction and a folded portion folded at an end portion of the first portion in other direction of the short direction, and
   the second flexible substrate includes a second portion extending in the other direction of the short direction and a folded portion folded at an end portion of the second portion in the one direction of the short direction.

2. The movable support device according to claim 1, wherein a thickness of the second flexible substrate is greater than a thickness of the first flexible substrate.

3. The movable support device according to claim 1, wherein the movable unit includes a position detector that detects a position of the movable unit in a movement direction of the movable unit and a drive coil that moves the movable unit, and
   the second flexible substrate further includes a wiring connected to the position detector and a wiring connected to the drive coil.

4. The movable support device according to claim 2, wherein the movable unit includes a position detector that detects a position of the movable unit in a movement direction of the movable unit and a drive coil that moves the movable unit, and the second flexible substrate further includes a wiring connected to the position detector and a wiring connected to the drive coil.

5. An image shake correction device comprising the movable support device according to claim 1.

6. An imaging device comprising the image shake correction device according to claim 5.

* * * * *